United States Patent
Iwase et al.

(10) Patent No.: US 8,836,187 B2
(45) Date of Patent: Sep. 16, 2014

(54) VEHICLE DRIVE DEVICE

(75) Inventors: Mikio Iwase, Anjo (JP); Tomohide Suzuki, Kariya (JP); Naoya Jinnai, Anjo (JP); Tatsuya Okishima, Chiryu (JP); Toshihiko Kamiya, Toyota (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 213 days.

(21) Appl. No.: 13/502,909

(22) PCT Filed: Nov. 19, 2010

(86) PCT No.: PCT/JP2010/070715
§ 371 (c)(1),
(2), (4) Date: Apr. 19, 2012

(87) PCT Pub. No.: WO2011/062265
PCT Pub. Date: May 26, 2011

(65) Prior Publication Data
US 2012/0217830 A1  Aug. 30, 2012

(30) Foreign Application Priority Data

Nov. 19, 2009  (JP) ................................. 2009-264381
Mar. 5, 2010  (JP) ................................. 2010-049192
Mar. 5, 2010  (JP) ................................. 2010-049193
Nov. 2, 2010  (JP) ................................. 2010-246514

(51) Int. Cl.
*H02K 7/108* (2006.01)
*B60K 6/442* (2007.10)
*B60K 6/547* (2007.10)
*B60K 6/26* (2007.10)
*B60K 6/48* (2007.10)
*B60K 6/405* (2007.10)
*F16H 57/04* (2010.01)
*F16H 45/00* (2006.01)

(52) U.S. Cl.
CPC . *B60K 6/48* (2013.01); *B60K 6/547* (2013.01); *B60K 6/26* (2013.01); *F16H 57/0473* (2013.01); *Y02T 10/6221* (2013.01); *F16H 57/0471* (2013.01); *F16H 2045/002* (2013.01); *F16H 57/0476* (2013.01); *B60K 6/405* (2013.01)

USPC ................... 310/78; 180/65.265; 180/65.275; 180/65.285

(58) Field of Classification Search
USPC ................... 310/78; 180/65.25, 65.2, 65.265, 180/65.275, 65.285; 903/903, 915, 952
See application file for complete search history.

(56) References Cited

U.S. PATENT DOCUMENTS 3,308,686 A   3/1967  Magg et al.
4,466,502 A   8/1984  Sakai (Continued)

FOREIGN PATENT DOCUMENTS

CN   1340009 A   3/2002
CN   101018687 A  8/2007

(Continued)

OTHER PUBLICATIONS

Feb. 4, 2013 Office Action issued in U.S. Appl. No. 12/926,446.
Aug. 2, 2013 Office Action issued in U.S. Appl. No. 13/522,597 issued in the name of Suyama.
Aug. 30, 2013 Notice of Allowance issued in U.S. Appl. No. 12/926,446.

(Continued)

*Primary Examiner* — Tran Nguyen
*Assistant Examiner* — Leda Pham
(74) *Attorney, Agent, or Firm* — Oliff PLC

(57) ABSTRACT

A vehicle drive device includes an input member coupled to an internal combustion engine; an output member coupled to a wheel; a rotating electrical machine; a fluid coupling; and a case containing at least the rotating electrical machine and the fluid coupling. The fluid coupling includes an input and an output that is paired with the input. The rotating electrical machine includes a rotor and a rotor support that extends radially inward from the rotor in an axial direction with respect to the coupling input, and supports the rotor via a support bearing. A power transmission member is formed by coupling at least the rotor support and the coupling input together so that at least the rotor support and the coupling input rotate together. A movement restricting mechanism restricts axial movement of the power transmission member toward the axial direction.

6 Claims, 7 Drawing Sheets

(56) References Cited

U.S. PATENT DOCUMENTS

| | | | |
|---|---|---|---|
| 6,092,985 A * | 7/2000 | Winkam | 415/124.1 |
| 6,258,001 B1 | 7/2001 | Wakuta et al. | |
| 6,340,339 B1 * | 1/2002 | Tabata et al. | 475/5 |
| 6,341,584 B1 | 1/2002 | Itoyama et al. | |
| 6,492,742 B1 | 12/2002 | Fujikawa et al. | |
| 6,524,216 B2 | 2/2003 | Suzuki et al. | |
| 6,533,692 B1 | 3/2003 | Bowen | |
| 6,585,066 B1 | 7/2003 | Koneda et al. | |
| 6,590,306 B2 | 7/2003 | Terada | |
| 6,679,796 B2 | 1/2004 | Sugano | |
| 6,719,076 B1 | 4/2004 | Tabata et al. | |
| 6,863,140 B2 | 3/2005 | Noreikat et al. | |
| 6,935,450 B1 | 8/2005 | Tsuzuki et al. | |
| 7,059,443 B2 | 6/2006 | Kira | |
| 7,086,978 B2 | 8/2006 | Aikawa et al. | |
| 7,114,484 B2 | 10/2006 | Kaita et al. | |
| 7,114,604 B2 | 10/2006 | Masuya | |
| 7,396,308 B2 | 7/2008 | Tabata et al. | |
| 7,489,114 B2 | 2/2009 | Nomura et al. | |
| 7,810,592 B2 | 10/2010 | Klemen et al. | |
| 7,954,578 B2 | 6/2011 | Kim et al. | |
| 8,155,848 B2 | 4/2012 | Kobayashi et al. | |
| 8,322,504 B2 | 12/2012 | Mueller et al. | |
| 8,333,680 B2 | 12/2012 | Kasuya et al. | |
| 8,360,186 B2 | 1/2013 | Yamamoto et al. | |
| 8,590,649 B2 | 11/2013 | Osawa et al. | |
| 8,602,940 B2 | 12/2013 | Kuwahara et al. | |
| 8,636,090 B2 | 1/2014 | Nomura et al. | |
| 2002/0043883 A1 | 4/2002 | Shimizu | |
| 2003/0127262 A1 | 7/2003 | Noreikat | |
| 2004/0029677 A1 | 2/2004 | Mori et al. | |
| 2004/0154846 A1 | 8/2004 | Kira | |
| 2005/0066933 A1 | 3/2005 | Kaita et al. | |
| 2005/0079942 A1 | 4/2005 | Bauknecht et al. | |
| 2006/0100060 A1 | 5/2006 | Kraska et al. | |
| 2006/0272869 A1 | 12/2006 | Hidaka et al. | |
| 2006/0289209 A1 | 12/2006 | Grosspietsch et al. | |
| 2007/0108857 A1 | 5/2007 | Nomura et al. | |
| 2007/0175723 A1 | 8/2007 | Blessing et al. | |
| 2007/0175726 A1 | 8/2007 | Combes et al. | |
| 2008/0047799 A1 | 2/2008 | Combes et al. | |
| 2009/0054203 A1 | 2/2009 | Heeke | |
| 2009/0100965 A1 | 4/2009 | Sanji et al. | |
| 2009/0271079 A1 | 10/2009 | Kobayashi et al. | |
| 2009/0283344 A1 | 11/2009 | Arnold et al. | |
| 2010/0038201 A1 | 2/2010 | Mueller et al. | |
| 2010/0062899 A1 | 3/2010 | Engelmann et al. | |
| 2010/0105518 A1 | 4/2010 | Kasuya et al. | |
| 2010/0132504 A1 | 6/2010 | Miller et al. | |
| 2010/0236856 A1 | 9/2010 | Nomura et al. | |
| 2011/0118079 A1 | 5/2011 | Mueller et al. | |
| 2011/0121692 A1 | 5/2011 | Iwase et al. | |
| 2011/0240430 A1 | 10/2011 | Iwase et al. | |
| 2011/0240431 A1 | 10/2011 | Iwase et al. | |
| 2012/0217830 A1 | 8/2012 | Iwase et al. | |
| 2012/0247911 A1 | 10/2012 | Noda et al. | |
| 2012/0258838 A1 | 10/2012 | Hartz et al. | |
| 2012/0318630 A1 | 12/2012 | Iwase et al. | |
| 2012/0319514 A1 * | 12/2012 | Iwase et al. | 310/78 |
| 2013/0008284 A1 | 1/2013 | Sada et al. | |
| 2013/0009522 A1 | 1/2013 | Ozaki et al. | |
| 2013/0057117 A1 | 3/2013 | Suzuki et al. | |

FOREIGN PATENT DOCUMENTS

| | | |
|---|---|---|
| DE | 10 2004 033141 A1 | 2/2006 |
| DE | 10 2009 022272 A1 | 12/2009 |
| EP | 1 800 929 A2 | 6/2007 |
| FR | 2 830 589 A1 | 4/2003 |
| JP | A-03-080612 | 4/1991 |
| JP | U-03-69748 | 7/1991 |
| JP | B2-03-072507 | 11/1991 |
| JP | A-07-217724 | 8/1995 |
| JP | A-08-277859 | 10/1996 |
| JP | B2-3080612 | 6/2000 |
| JP | A-2002-220078 | 8/2002 |
| JP | A-2005-212494 | 8/2005 |
| JP | A-2006-137406 | 6/2006 |
| JP | A-2007-015810 | 1/2007 |
| JP | A-2007-071083 | 3/2007 |
| JP | A-2007-118717 | 5/2007 |
| JP | A-2009-001127 | 1/2009 |
| JP | A-2009-001165 | 1/2009 |
| JP | A-2009-11010 | 1/2009 |
| JP | A-2009-101730 | 5/2009 |
| JP | A-2009-262659 | 11/2009 |
| WO | WO 2008/092426 A2 | 8/2008 |
| WO | WO 2010/017786 A1 | 2/2010 |

OTHER PUBLICATIONS

Dec. 9, 2013 Corrected Notice of Allowability issued in U.S. Appl. No. 12/926,446.
Feb. 8, 2011 International Search Report issued in Application No. PCT/JP2010/070715 (with English translation).
Jul. 8, 2011 International Search Report issued in Application No. PCT/JP2011/055720.
May 6, 2011 International Search Report issued in Application No. PCT/JP2011/053886.
May 11, 2011 International Search Report issued in application No. PCT/JP2011/053887.
May 31, 2011 International Search Report issued in Application No. PCT/JP2011/055721.
Feb. 8, 2011 International Search Report issued in Application No. PCT/JP2010/070717 (with translation).
Feb. 8, 2011 International Search Report issued in Application No. PCT/JP2010/070714 (with translation).
Feb. 8, 2011 International Search Report issued in Application No. PCT/JP2010/070716 (with translation).
Dec. 26, 2012 Office Action issued in U.S. Appl. No. 13/522,135.
Mar. 18, 2013 Office Action issued in U.S. Appl. No. 12/926,447.
Mar. 28, 2013 Notification of Reasons for Refusal issued in Japanese Patent Application No. 2010-049193 (partial translation).
U.S. Appl. No. 12/948,297, filed Nov. 17, 2010 in the name of Mikio Iwase et al.
U.S. Appl. No. 13/522,597, filed Jul. 17, 2012 in the name of Daiki Suyama et al.
U.S. Appl. No. 13/522,426, filed Jul. 16, 2012 in the name of Daiki Suyama et al.
U.S. Appl. No. 13/522,135, filed Jul. 13, 2012 in the name of Mikio Iwase et al.
U.S. Appl. No. 12/926,446, filed Nov. 18, 2010 in the name of Mikio Iwase et al.
U.S. Appl. No. 12/926,447, filed Nov. 18, 2010 in the name of Mikio Iwase et al.
U.S. Appl. No. 13/522,651, filed Jul. 17, 2012 in the name of Mikio Iwase et al.
Nov. 7, 2013 Notification of Reason(s) for Refusal issued in Japanese Patent Application No. 2010-246515 (partial translation).
Oct. 17, 2013 Office Action issued in U.S. Appl. No. 12/926,447.
Jun. 27, 2013 Notification of Reason(s) for Refusal issued in Japanese Patent Application No. 2010-246511, (partial translation only).
Apr. 26, 2013 Notice of Allowance issued in U.S. Appl. No. 12/926,446.
Nice et al., "How Clutches Work," *HowStuffWorks.com*, Oct. 16, 2007, <http://auto.howstuffworks.com/clutch.htm>.
Office Action issued in U.S. Appl. No. 13/522,597 dated Mar. 7, 2014.
Apr. 25, 2014 European Search Report issued in EP 10 83 1658.
Apr. 25, 2014 Notice of Allowance issued in U.S. Appl. No. 13/522,426.
May 6, 2014 Notice of Allowance issued in U.S. Appl. No. 12/948,297.
May 6, 2014 Office Action issued in U.S. Appl. No. 12/926,447.

* cited by examiner

F I G . 3
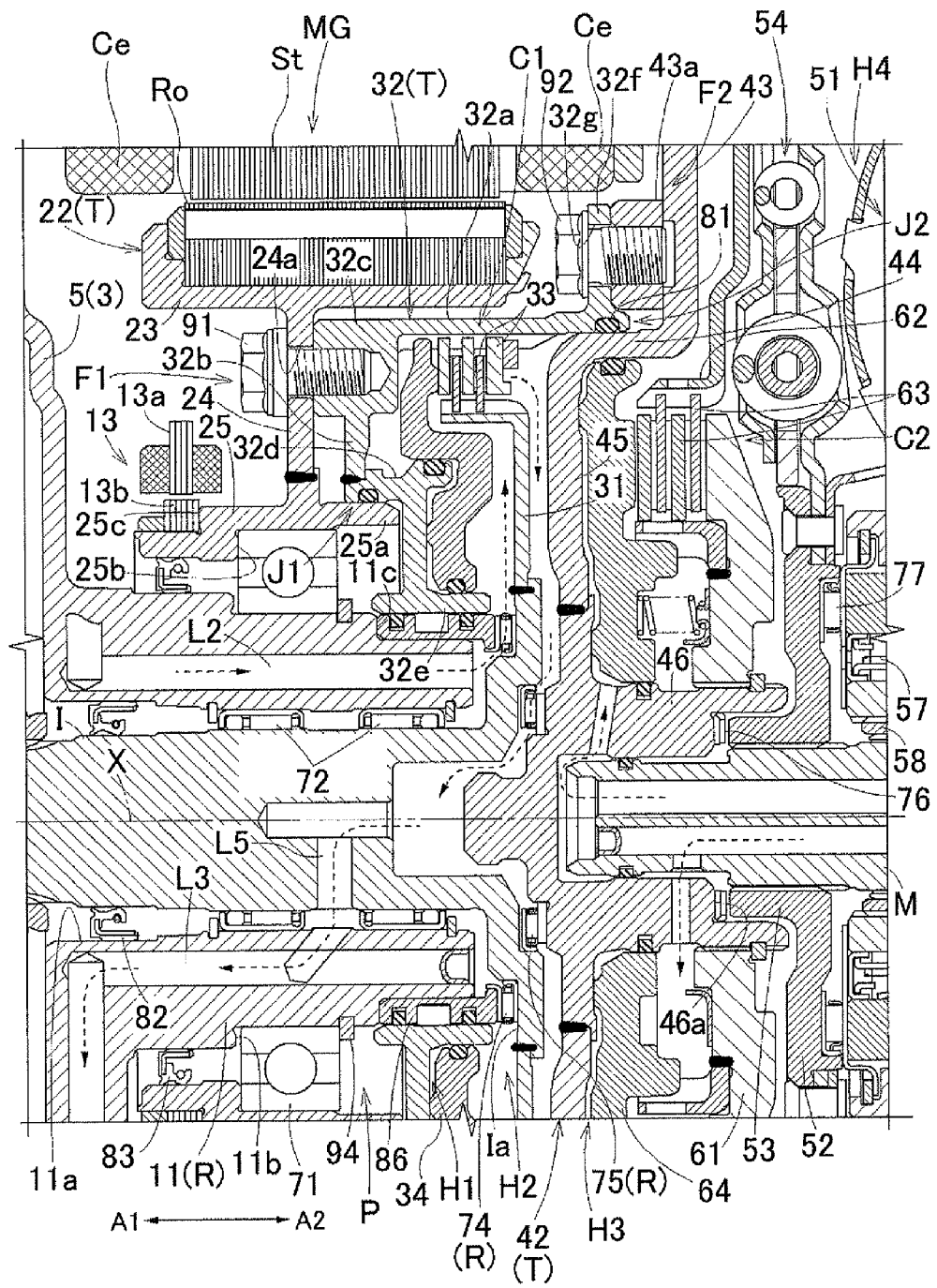

VEHICLE DRIVE DEVICE

INCORPORATION BY REFERENCE

The disclosure of Japanese Patent Applications No. 2009-264381 filed on Nov. 19, 2009, No. 2010-049192 filed on Mar. 5, 2010, No. 2010-049193 filed on Mar. 5, 2010, and No. 2010-246514 filed on Nov. 2, 2010 including the specification, drawings and abstract is incorporated herein by reference in its entirety.

BACKGROUND OF THE INVENTION

The present invention relates to vehicle drive devices including an input member drivingly coupled to an internal combustion engine, an output member drivingly coupled to wheels, a rotating electrical machine, a fluid coupling, and a case accommodating at least the rotating electrical machine and the fluid coupling.

DESCRIPTION OF THE RELATED ART

A device described in, e.g., Japanese Patent No. 3080612 below is known as such a vehicle drive device. As shown in FIG. 1 of Japanese Patent No. 3080612, in this vehicle drive device, a rotor support member (a rotor 8) that supports a rotor main body of a rotating electrical machine (a starter/generator in Japanese Patent No. 3080612; the same applies to the following description), and a coupling input-side member (a pump impeller 5) of a fluid coupling (a hydrodynamic torque converter) are coupled together so as to rotate together. The rotor support member is rotatably supported via a support bearing (a radial bearing 9) in the radial direction by a boss portion of a case (a casing 10).

When there is a difference in rotational speed between the coupling input-side member and a coupling output-side member of the fluid coupling, a negative pressure is generated therebetween due to the difference in rotational speed, thereby generating an attractive force that is applied in such a direction that attracts these members toward each other. Normally, the coupling output-side member of the fluid coupling is structured to be rotatable to some degree in the axial direction by spline coupling, etc. relative to a driven member to which a driving force from the coupling output-side member is transmitted. Thus, a thrust bearing is often provided between the coupling output-side member and the coupling input-side member in order to restrict movement of the coupling output-side member in the axial direction toward the coupling input-side member due to the attractive force.

However, the study by the inventors showed that relative movement in the axial direction between the coupling output-side member and the driven member may not be appropriately implemented in some cases. That is, if a relatively large driving force is transmitted between the coupling output-side member and the driven member, large torque is also applied to a torque transmitting portion located therebetween. Thus, slipping is less likely to occur at a coupling portion between the coupling output-side member and the driven member, such as a spline coupling portion, which may hinder the movement of the coupling output-side member in the axial direction. If the attractive force is generated in this case, the coupling input-side member moves toward the coupling output-side member. If the rotational speed of the coupling input-side member and the coupling output-side member increases, a cover portion containing the coupling input-side member and the coupling output-side member may deform so as to expand in the axial direction due to a centrifugal force that is applied to oil contained in the coupling input-side member and the coupling output-side member. In this case, the amount of movement of the coupling input-side member in the axial direction is further increased.

In the device of Japanese Patent No. 3080612, the coupling input-side member and the rotor support member are coupled together so as to rotate together. Thus, if these phenomena occur, an axial load is applied to the support bearing via the coupling input-side member and the rotor support member that are integrally coupled together. Thus, in the structure of the device of Japanese Patent No. 3080612, the support bearing needs to have such capability that can resist this axial load, which necessarily results in an increase in size of the support bearing. Increasing the size of the support bearing is not preferable because such increase leads to an increase of the size and manufacturing cost of vehicle drive devices.

SUMMARY OF THE INVENTION

It is therefore desired to implement vehicle drive devices capable of suppressing an increase in size of a support bearing even when a coupling input-side member may move in the axial direction due to an attractive force that is generated between the coupling input-side member and a coupling output-side member of a fluid coupling.

A vehicle drive device according to a first aspect of the present invention includes: an input member drivingly coupled to an internal combustion engine; an output member drivingly coupled to a wheel; a rotating electrical machine; a fluid coupling; and a case containing at least the rotating electrical machine and the fluid coupling. In the vehicle drive device, the fluid coupling includes a coupling input-side member and a coupling output-side member that is paired with the coupling input-side member, the rotating electrical machine includes a rotor main body, and a rotor support member that extends inward in a radial direction from the rotor main body on an axial first direction side, which is one side in an axial direction with respect to the coupling input-side member, and supports the rotor main body, and that is rotatably supported in the radial direction by the case via a support bearing, a power transmission member is formed by coupling at least the rotor support member and the coupling input-side member together so that at least the rotor support member and the coupling input-side member rotate together, and a movement restricting mechanism that restricts axial movement of the power transmission member toward the axial first direction side is provided.

Note that as used herein, the expression "drivingly coupled" refers to the state in which two rotating elements are coupled together so as to be able to transmit a driving force therebetween, and is used as a concept including the state in which the two rotating elements are coupled together so as to rotate together, or the state in which the two rotating elements are coupled together so as to be able to transmit a driving force therebetween via one or more transmission members. Such transmission members include various members that transmit rotation at the same speed or after changing the speed of the rotation, and for example, include a shaft, a gear mechanism, a belt, a chain, etc. Such transmission members may include an engagement device that selectively transmits rotation and a driving force, such as, e.g., a friction clutch and a claw clutch.

The term "rotating electrical machine" is used as a concept including a motor (an electric motor), a generator (an electric generator), and a motor-generator that functions both as the motor and the generator as necessary.

The term "fluid coupling" is used as a concept including both a torque converter having a torque amplifying function, and a normal fluid coupling having no torque amplifying function.

According to the first aspect, the rotor main body of the rotating electrical machine can be appropriately rotatably supported on the axial first direction side with respect to the coupling input-side member by the rotor support member that is rotatably supported in the radial direction by the case via the support bearing. In the first aspect, the movement restricting mechanism restricts the axial movement of the power transmission member, which is formed by coupling the rotor support member and the coupling input-side member so that the rotor support member and the coupling input-side member rotates together, toward the axial first direction side. Thus, even if the coupling input-side member is moved in the axial first direction by an attractive force that is applied between the coupling input-side member and the coupling output-side member of the fluid coupling due to a difference in rotational speed therebetween, the movement restricting mechanism can suppress application of an axial load to the support bearing via the power transmission member. Thus, the support bearing need not be reinforced even in such a case, and an increase in size of the support bearing can be suppressed.

According to a second aspect of the present invention, the movement restricting mechanism may have a restricting bearing that rotatably supports the power transmission member separately from the support bearing, and an axial support portion of the case that supports the restricting bearing from the axial first direction side.

According to the second aspect, the restricting bearing that rotatably supports the power transmission member in the axial direction is provided separately from the support bearing, and the restricting bearing is supported from the axial first direction side by the axial support portion of the case. Thus, the movement restricting mechanism that restricts the axial movement of the power transmission member in the axial first direction can be appropriately structured. This can more reliably prevent the axial load from being applied to the support bearing.

According to a third aspect of the present invention, a distance by which the power transmission member may be movable relative to the case in the axial direction in a region where the restricting bearing is provided be set to a value smaller than a distance by which the power transmission member is movable relative to the case in the axial direction in a region where the support bearing is provided.

According to the third aspect, even when the power transmission member is moved relative to the case in the axial direction, the power transmission member cannot make relative movement in the axial direction in the region where the restricting bearing is provided in the state in which the distance by which the power transmission member is movable relative to the case in the axial direction in the region where the support bearing is provided is not completely eliminated. This reliably restricts further movement of the power transmission member toward the case in the axial direction from this state, whereby application of the axial load to the support bearing can be more reliably suppressed.

According to a fourth aspect of the present invention, the coupling input-side member may include a cover portion that contains a main body of the fluid coupling, the case may have a support wall that extends at least in the radial direction on the axial first direction side with respect to the rotating electrical machine and the fluid coupling and a cylindrical protruding portion that protrudes from the support wall toward an axial second direction side that is opposite to the axial first direction side, and the rotor support member may be supported by an outer peripheral surface of the cylindrical protruding portion via the support bearing, and the cover portion is rotatably supported at an end of the cylindrical protruding portion on the axial second direction side by the movement restricting mechanism.

According to the fourth aspect, the rotor support member and the rotor main body can be appropriately rotatably supported on the outer peripheral surface of the cylindrical protruding portion of the support wall provided in the case via the support bearing. Moreover, in this fourth aspect, the movement restricting mechanism using the end of the cylindrical protruding portion on the axial second direction side can rotatably support the cover portion of the coupling input-side member in the axial direction. Thus, a mechanism that restricts the axial movement of the power transmission member on the axial first direction side can be structured in a compact manner by using the cylindrical protruding portion for rotatably supporting the rotor support member and the rotor main body.

According to a fifth aspect of the present invention, the vehicle drive device may further include an engagement device having an engagement input-side member, and an engagement output-side member that is paired with the engagement input-side member. In the vehicle drive device, the input member may be coupled to the engagement input-side member via an input-side radially extending portion that extends in the radial direction between the cylindrical protruding portion and the cover portion in the axial direction so that the input member and the engagement input-side member rotate together, the engagement output-side member may be coupled to the rotor support member and the coupling input-side member so as to rotate together therewith and forms, together with the rotor support member and the coupling input-side member, the power transmission member, and the movement restricting mechanism may have two restricting bearings separate from the support bearing, which are placed between the cylindrical protruding portion and the input-side radially extending portion in the axial direction and between the input-side radially extending portion and the cover portion in the axial direction, respectively.

According to the fifth aspect, the internal combustion engine that is drivingly coupled to the engagement input-side member via the input member, and the rotating electrical machine that is drivingly coupled to the engagement output-side member can be selectively drivingly coupled together by the engagement device. Thus, for example, in the case where a vehicle travels only by output torque of the rotating electrical machine, energy loss due to drag loss of the internal combustion engine can be suppressed.

Moreover, in this fifth aspect, the input-side radially extending portion of the input member extends in the radial direction between the cylindrical protruding portion and the fluid coupling in the axial direction. However, since the restricting bearings separate from the support bearing are provided between the cylindrical protruding portion and the input-side radially extending portion, and between the input-side radially extending portion and the power transmission member, respectively, the input member that is coupled to the engagement input-side member can be appropriately supported in the axial direction. Furthermore, by using the end of the cylindrical protruding portion on the axial second direction side, the cover portion can be appropriately supported in the axial direction with respect to the cylindrical protruding portion via the input-side radially extending portion and the two restricting bearings.

According to a sixth aspect of the present invention, the fluid coupling may be a torque converter having a stator between the coupling input-side member and the coupling output-side member, the stator may be coupled to the case via a one-way clutch, the coupling input-side member may have a first direction-side support portion that is located on the axial first direction side with respect to the one-way clutch, the coupling output-side member may have an output-side radially extending portion that extends in the radial direction between the first direction-side support portion and the one-way clutch in the axial direction, and the bearings separate from the support bearing may be placed between the first-direction side support portion and the output-side radially extending portion in the axial direction and between the output-side radially extending portion and the one-way clutch in the axial direction, respectively.

According to the sixth aspect, even if the coupling output-side member is movable toward the axial first direction side, such as in the case where small torque is transmitted between the coupling output-side member and a driven member to which a driving force from the coupling output-side member is transmitted, the torque converter as the fluid coupling can be appropriately supported in the axial direction with respect to the first direction-side support portion by the bearings provided between the first direction-side support portion and the output-side radially extending portion and between the output-side radially extending portion and the one-way clutch, respectively.

Moreover, according to this sixth aspect, torque that is input to the coupling input-side member can be amplified and transmitted to the coupling output-side member by the torque converter.

BRIEF DESCRIPTION OF THE DRAWINGS

FIG. 3 is a cross-sectional view of a main portion of the drive device according to the embodiment of the present invention;

DETAILED DESCRIPTION OF THE EMBODIMENTS

Figure 1:
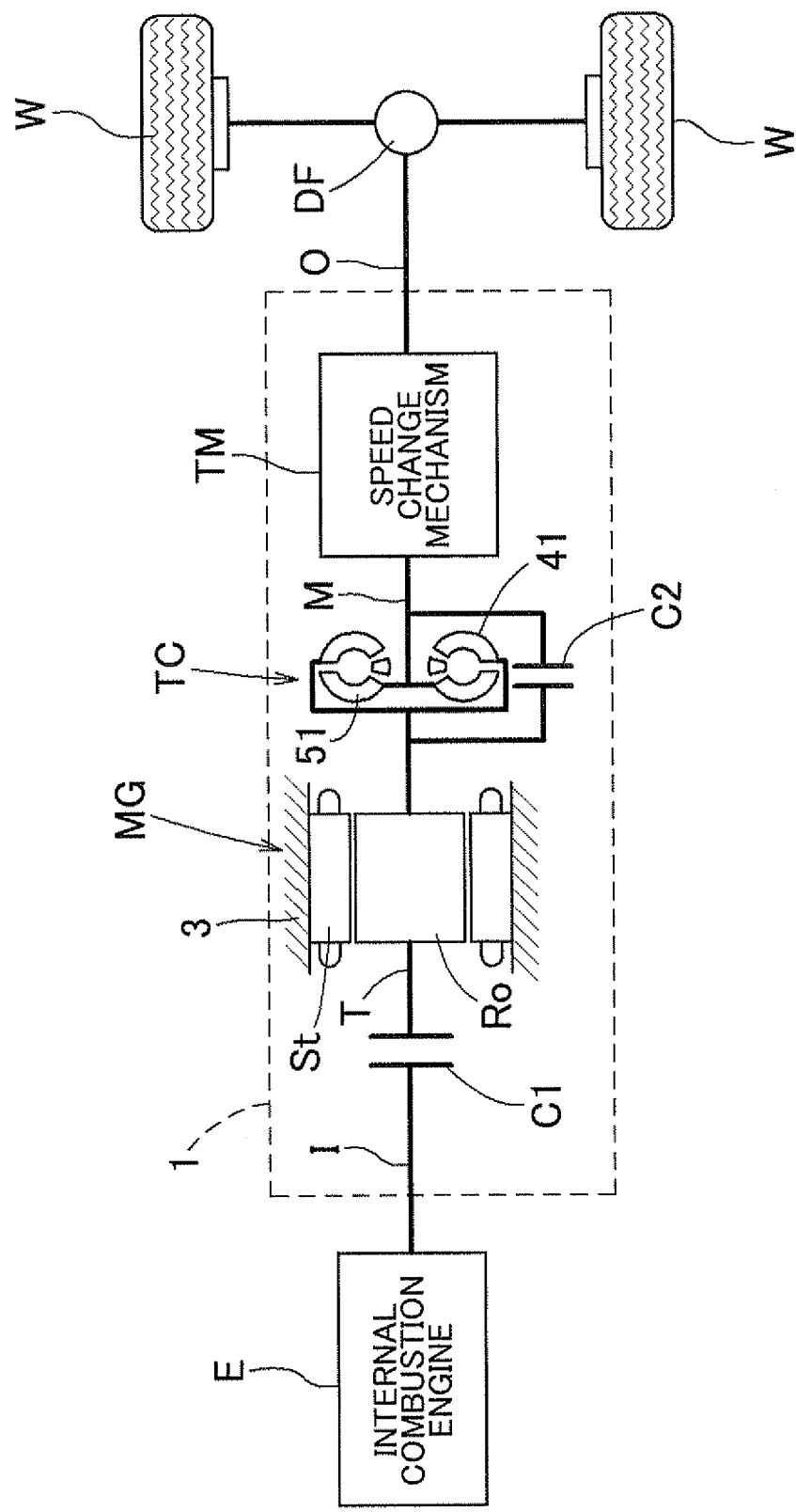
FIG. 1 is a schematic diagram showing a schematic structure of a drive device according to an embodiment of the present invention.

An embodiment of the present invention will be described below with reference to the accompanying drawings. As shown in FIG. 1, a drive device 1 is a drive device for hybrid vehicles (a hybrid drive device) using one or both of an internal combustion engine E and a rotating electrical machine MG as a driving force source of a vehicle. The drive device 1 is structured as a drive device for so-called one-motor parallel type hybrid vehicles. The drive device 1 of the present embodiment will be described in detail below.

1. Overall Structure of Drive Device

First, the overall structure of the drive device 1 of the embodiment will be described below. As shown in FIG. 1, the drive device 1 includes an input shaft I drivingly coupled to the internal combustion engine E as a first driving force source of a vehicle, an output shaft O drivingly coupled to wheels W, the rotating electrical machine MG as a second driving force source of the vehicle, and a torque converter TC. The drive device 1 further includes an input clutch C1 and a speed change mechanism TM. These elements are sequentially arranged on a power transmission path in the following order from the internal combustion engine side E: the input shaft I; the input clutch C1; the rotating electrical machine MG; the torque converter TC; the speed change mechanism TM; and the output shaft O. The structures of these elements except for a part of the input shaft I and a part of the output shaft O are accommodated in a case (a drive device case) 3. In the present embodiment, the input shaft I corresponds to an "input member" in the present invention, and the output shaft O corresponds to an "output member" in the present invention.

Note that in the present embodiment, all of the input shaft I, the rotating electrical machine MG, the torque converter TC, and the output shaft O are positioned on a central axis X (see FIG. 2), and the drive device 1 of the present embodiment has a uniaxial structure that is suitable for being mounted on front-engine, rear-wheel drive (FR) vehicles. In the following description, the "axial direction," the "radial direction," and the "circumferential direction" are defined based on the central axis X unless otherwise specified. Regarding the directionality along the axial direction when referring to specific portions in the drive device 1, the direction toward the internal combustion engine E side (toward the left side in FIG. 2) which is one side in the axial direction is herein referred to as the "axial first direction A1," and the direction toward the output shaft O side (toward the right side in FIG. 2) which is the other side in the axial direction is referred to as the "axial second direction A2."

The internal combustion engine E is a device that is driven by combustion of fuel in the engine to output motive power, and for example, various known engines such as a gasoline engine and a diesel engine can be used as the internal combustion engine E. In this example, an output rotating shaft such as a crankshaft of the internal combustion engine E is drivingly coupled to the input shaft I via a first damper 16 (see FIG. 2). The input shaft I is drivingly coupled to the rotating electrical machine MG via the input clutch C1, and the input shaft I is selectively drivingly coupled to the rotating electrical machine MG by the input clutch C1. When the input clutch C1 is in an engaged state, the internal combustion engine E is drivingly coupled to the rotating electrical machine MG via the input shaft I. When the input clutch C1 is in a disengaged state, the internal combustion engine E is separated from the rotating electrical machine MG. In the present embodiment, the input clutch C1 corresponds to an "engagement device" in the present invention.

The rotating electrical machine MG has a stator St and a rotor Ro, and is capable of functioning as a motor (an electric motor) that is supplied with electric power to generate motive power, and as a generator (an electric generator) that is supplied with motive power to generate electric power. Thus, the rotating electrical machine MG is electrically connected to an electricity storage device (not shown). In this example, a battery is used as the electricity storage device. Note that a capacitor, etc. may also be used as the electricity storage device. The rotating electrical machine MG is supplied with electric power from the battery to perform power running, or supplies output torque (herein used as a synonym for the "driving force") of the internal combustion engine E or electric power generated by an inertial force of the vehicle to the battery to accumulate the electric power therein. The rotor Ro of the rotating electrical machine MG is drivingly coupled to a pump impeller 41 of the torque converter TC that forms a power transmission member T.

The torque converter TC is a device that converts torque of one or both of the internal combustion engine E and the rotating electrical machine MG to transmit the converted torque to an intermediate shaft M. The torque converter TC includes the pump impeller 41 drivingly coupled to the rotor Ro of the rotating electrical machine MG, a turbine runner 51 drivingly coupled to the intermediate shaft M so as to rotate therewith, and a stator 56 (see FIG. 2) provided between the pump impeller 41 and the turbine runner 51. The torque converter TC is capable of transmitting torque between the pump impeller 41 and the turbine runner 51 via oil contained in the torque converter TC. At this time, if there is a difference in rotational speed between the pump impeller 41 and the turbine runner 51, the torque converted according to the rotational speed ratio therebetween is transmitted. In the present embodiment, the torque converter TC corresponds to a "fluid coupling."

The torque converter TC includes a lockup clutch C2. The lockup clutch C2 selectively drivingly couples the pump impeller 41 to the turbine runner 51. When the lockup clutch C2 is in an engaged state, the torque converter TC transmits the torque of one or both of the internal combustion engine E and the rotating electrical machine MG to the intermediate shaft M as it is without using the oil contained in the torque converter TC. The intermediate shaft M serves as an input shaft (a speed change input shaft) of the speed change mechanism TM.

The speed change mechanism TM is a device that changes the rotational speed of the intermediate shaft M at a predetermined speed ratio to transmit the resultant rotation to the output shaft O. In the present embodiment, an automatic stepped speed change mechanism including a plurality of switchable shift speeds having different speed ratios is used as such a speed change mechanism TM. Note that an automatic continuously variable speed change mechanism capable of continuously changing the speed ratio, a manual stepped speed change mechanism having a plurality of switchable shift speeds having different speed ratios, etc. may be used as the speed change mechanism TM. The speed change mechanism TM changes the rotational speed of the intermediate shaft M at a predetermined shift ratio at each time and converts the torque to transmit the resultant rotation and torque to the output shaft O. The rotation and torque thus transmitted to the output shaft O are distributed and transmitted to the two wheels W, namely the right and left wheels W, via an output differential gear unit DF. Thus, the drive device 1 can transmit the torque of one or both of the internal combustion engine E and the rotating electrical machine MG to the wheels W to cause the vehicle to move.

2. Structure of Each Portion of Drive Device

Figure 4:
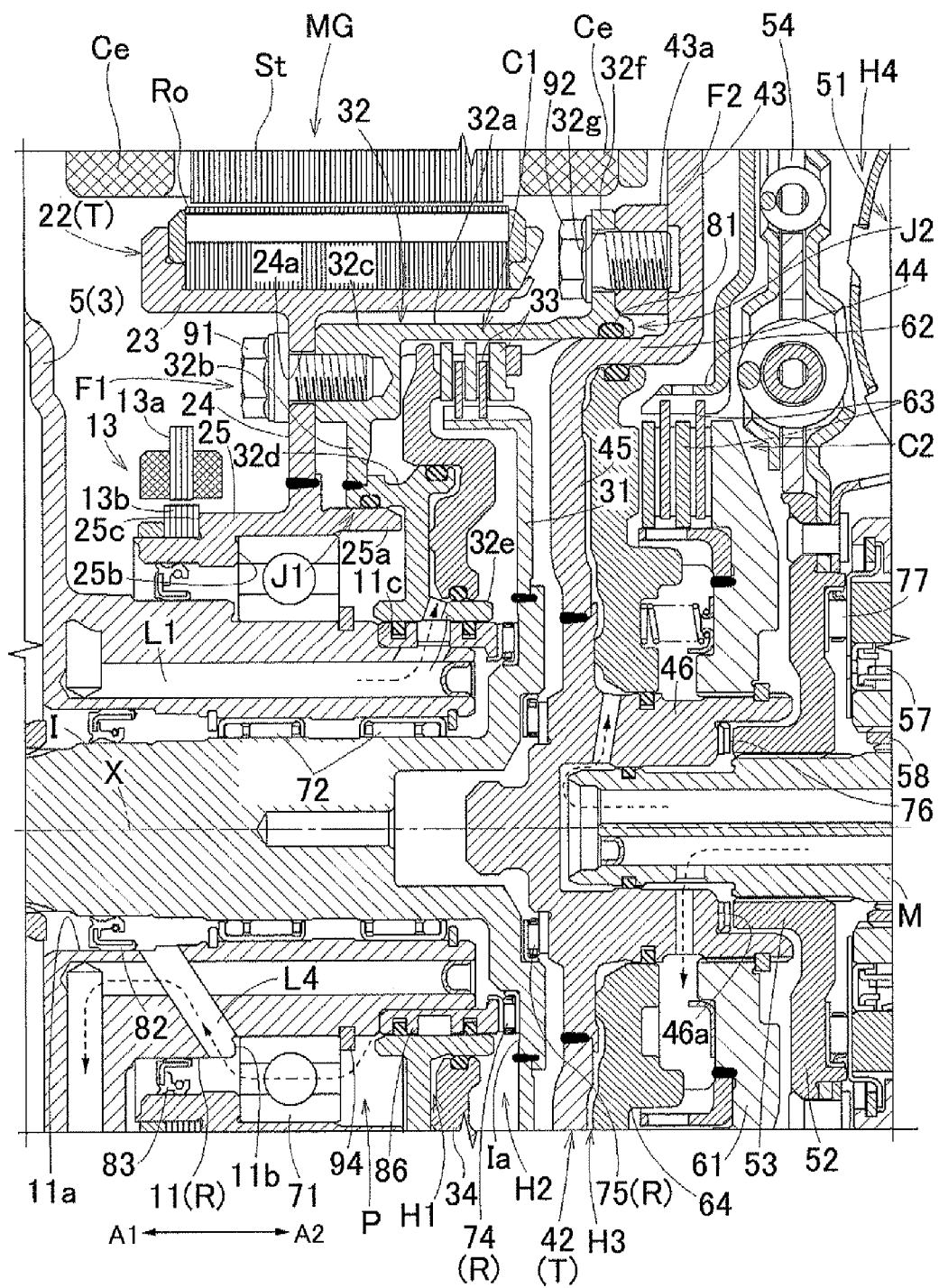
FIG. 4 is a cross-sectional view of a main portion of the drive device according to the embodiment of the present invention.

The structure of each portion of the drive device 1 of the present embodiment will be described with reference to FIGS. 2 to 4. Note that FIG. 3 is a partial enlarged view of the cross-sectional view of FIG. 2, and FIG. 4 is a cross-sectional view at a different position in the circumferential direction from FIG. 3.

2-1. Case

Figure 2:
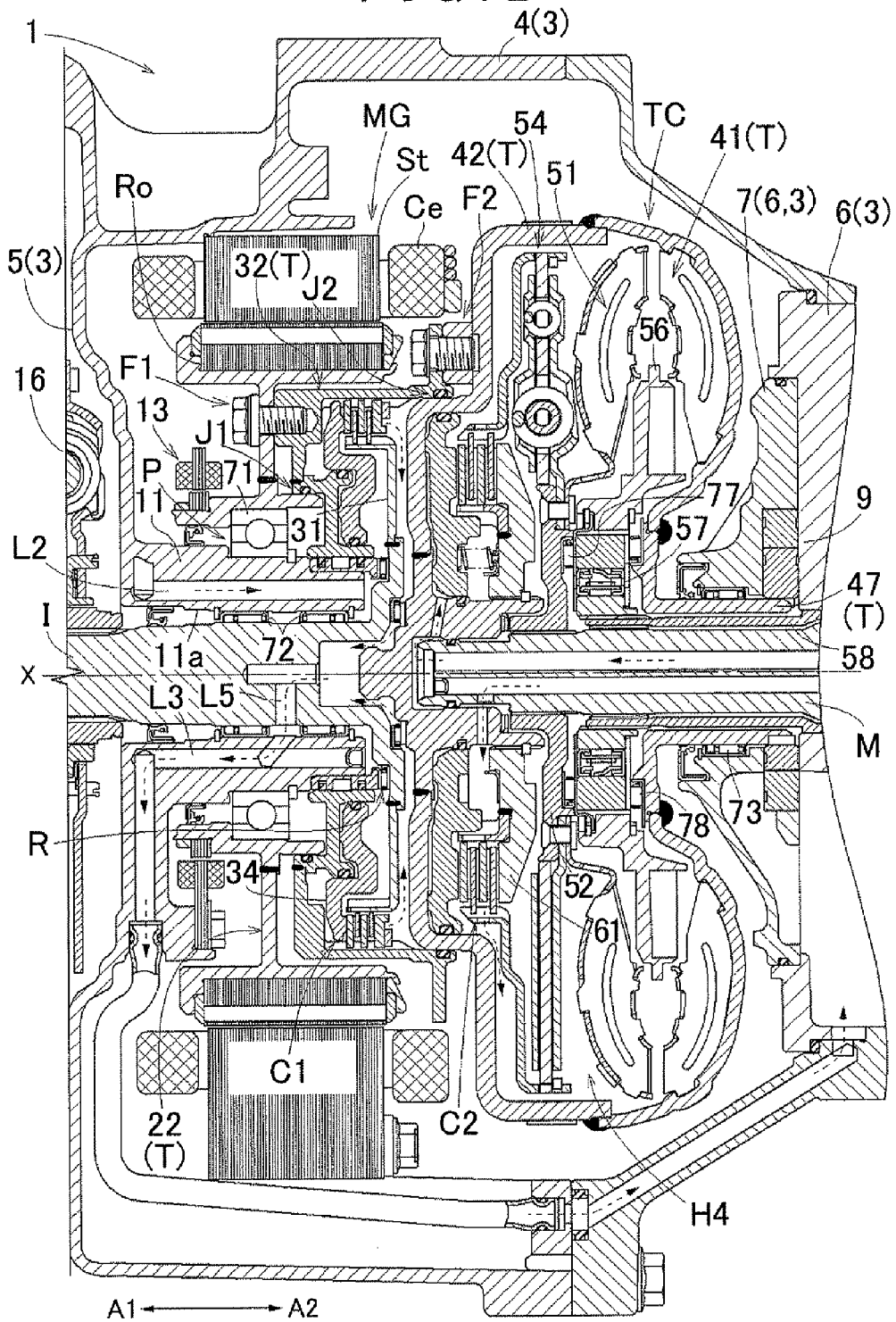
FIG. 2 is a partial cross-sectional view of the drive device according to the embodiment of the present invention.

As shown in FIG. 2, the case 3 has a generally cylindrical shape. In the present embodiment, the case 3 includes a peripheral wall 4 that has a generally cylindrical shape and covers the outer sides in the radial direction of the rotating electrical machine MG the input clutch C1, the torque converter TC, etc., an end support wall 5 that covers the rotating electrical machine MG and the input clutch C1 on the axial first direction A1 side, and an intermediate support wall 6 that covers the torque converter TC on the axial second direction A2 side. The rotating electrical machine MG, the input clutch C1, and the torque converter TC are accommodated in a space between the end support wall 5 and the intermediate support wall 6 in the case 3. Although not shown in the drawing, the speed change mechanism TM is accommodated in a space located on the axial second direction A2 side with respect to the intermediate support wall 6. Note that the first damper 16 is placed in an outer space of the case 3, which is located on the axial first direction A1 side with respect to the end support wall 5.

The end support wall 5 is shaped to extend at least in the radial direction, and in this example, is a wall portion substantially in a disc shape extending in the radial and circumferential directions. In the present embodiment, the end support wall 5 corresponds to a "support wall" in the present invention. A cylindrical protruding portion 11 is provided in a radial center portion of the end support wall 5. The cylindrical protruding portion 11 is a cylindrical protruding portion that is positioned coaxially with the central axis X and foamed so as to protrude in the axial second direction A2 from the end support wall 5. The cylindrical protruding portion 11 is formed integrally with the end support wall 5. The cylindrical protruding portion 11 has a certain axial length. In the illustrated example, the cylindrical protruding portion 11 has a larger axial length than the rotor Ro. A central axis through hole 11*a* is formed in the radial center portion of the cylindrical protruding portion 11 so as to extend therethrough in the axial direction. The input shaft I is inserted through the central axis through hole 11*a*. Thus, the input shaft I is placed so as to extend through a radially inner side of the cylindrical protruding portion 11, and extends through the end support wall 5, whereby the input shaft I is inserted into the case 3.

Figure 5:
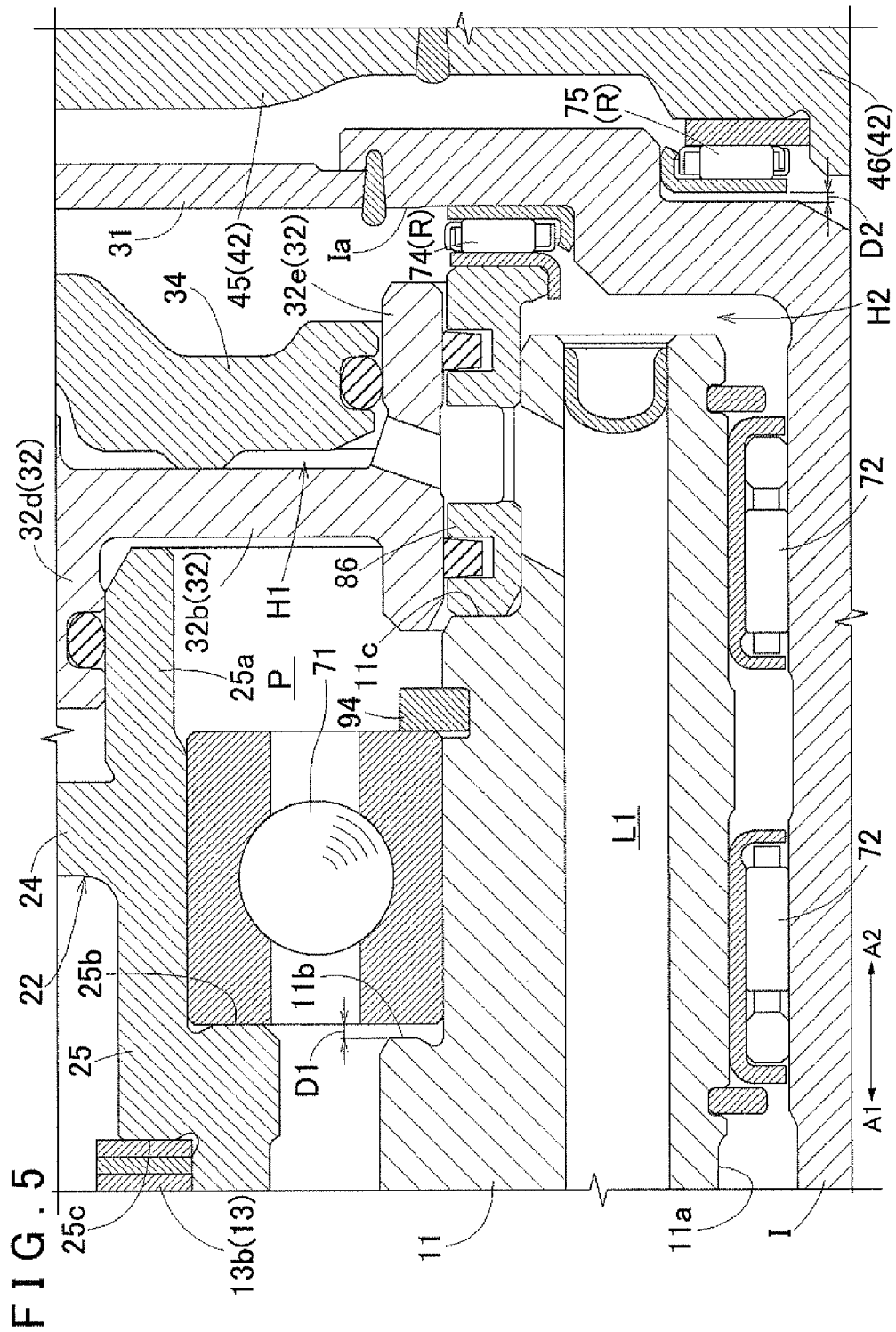
FIG. 5 is a partial enlarged cross-sectional view of a main portion of the drive device according to the embodiment of the present invention.

As shown in FIG. 3, etc., in the present embodiment, a first stepped portion 11*b* is provided at a predetermined axial position on the outer peripheral surface of the cylindrical protruding portion 11. With the first stepped portion 11*b* serving as a boundary, a portion of the outer peripheral surface of the cylindrical protruding portion 11 located on the axial first direction A1 side with respect to the first stepped portion 11*b* serves as a larger diameter portion, and a portion of the outer peripheral surface located on the axial second direction A2 side with respect to the first stepped portion 11*b* serves as a smaller diameter portion. A first bearing 71 is placed so as to contact the outer peripheral surface of the smaller diameter portion. In the present embodiment, the first bearing 71 is placed so as to be spaced apart from the side face of the first stepped portion 11*b* on the axial second direction A2 side. A bearing capable of receiving a radial load is used as the first bearing 71, and a ball bearing is used in this example. In the present embodiment, the first bearing 71 corresponds to a "support bearing" in the present invention. The first bearing 71 is placed so that its movement in the axial second direction A2 is restricted by a snap ring 94 (see FIG. 5) latched on the outer peripheral surface of the smaller diameter portion. Note that the first stepped portion 11b is formed at an axial position located slightly on the axial first direction A1 side with respect to an inner peripheral stepped portion 25b of a support cylindrical portion 25.

A second stepped portion 11c is provided on the outer peripheral surface of the cylindrical protruding portion 11 at a predetermined position located on the axial second direction A2 side with respect to the first stepped portion 11b. With the second stepped portion 11c serving as a boundary, a portion of the outer peripheral surface of the cylindrical protruding portion 11 on the axial second direction A2 side with respect to the second stepped portion 11c is formed to have a further smaller diameter. A sleeve 86 is fitted to contact the outer peripheral surface of an end of the cylindrical protruding portion 11 on the axial second direction A2 side where the diameter is smaller than the smaller diameter portion as described above. The sleeve 86 has the same outer diameter as that of the smaller diameter portion of the cylindrical protruding portion 11. Communication holes that connect the inner peripheral surface with the outer peripheral surface of the sleeve 86 are formed at a plurality of circumferential positions of the sleeve 86.

In the present embodiment, a plurality of oil passages are formed in the cylindrical protruding portion 11. Specifically, as shown in FIGS. 3 and 4, four oil passages, namely a first oil passage L1, a second oil passage L2, a third oil passage L3, and a fourth oil passage L4, are formed in the cylindrical protruding portion 11. The first oil passage L1 is an oil supply passage that communicates with a hydraulic oil pressure chamber H1 of the input clutch C1, which will be described later, and supplies oil to the hydraulic oil pressure chamber H1 (see FIG. 4). The second oil passage L2 is an oil supply passage that communicates with a circulating oil pressure chamber H2 of the input clutch C1, which sill be described later, and supplies oil to the circulating oil pressure chamber H2 (see FIG. 3). The third oil passage L3 is an oil discharge passage for returning oil discharged from the circulating oil pressure chamber H2 to an oil pan (not shown) (see FIG. 3). The fourth oil passage L4 is an oil discharge passage for returning oil discharged from a bearing placement space P, which will be described later, to the oil pan (not shown) (see FIG. 4).

The intermediate support wall 6 is shaped to extend at least in the radial direction, and in this example, is a wall portion in a flat disc shape extending in the radial and circumferential directions. In the present embodiment, the intermediate support wall 6 is formed as a separate member from the end support wall 5. The intermediate support wall 6 is also formed as a separate member from the peripheral wall 4, and is fixedly fastened to a stepped portion formed on the inner peripheral surface of the peripheral wall 4, by using a fastening member such as a bolt. An oil pump 9 is provided on the intermediate support wall 6. In this example, a pump cover 7 is attached to the surface of the intermediate support wall 6 on the axial first direction A1 side, and a pump rotor is accommodated in a pump chamber formed between the intermediate support wall 6 and the pump cover 7. A through hole is formed in the radial center portions of the intermediate support wall 6 and the pump cover 7 so as to extend therethrough in the axial direction, and the intermediate shaft M is inserted through the through hole. A fixed shaft 58 and a pump drive shaft 47 are also inserted through the insertion hole. The fixed shaft 58 is a cylindrical shaft portion fixed to the intermediate support wall 6 to support the stator 56 of the torque converter TC, and is placed coaxially with the central axis X and radially outside the intermediate shaft M. The pump drive shaft 47 is a cylindrical shaft portion that rotates together with the pump impeller 41 of the torque converter TC, and is positioned coaxially with the central axis X and radially outside the fixed shaft 58.

In the present embodiment, the oil pump 9 is an internal gear pump having an inner rotor and an outer rotor as pump rotors. The pump rotors of the oil pump 9 are drivingly coupled via the pump drive shaft 47 so as to rotate together with the pump impeller 41. Thus, with rotation of the pump impeller 41, the oil pump 9 discharges oil to generate an oil pressure for supplying the oil to each portion of the drive device 1. A suction oil passage and a discharge oil passage of the oil pump 9 are formed in the intermediate support wall 6 and the pump cover 7. As partially shown in FIG. 2, etc., oil passages for supplying such oil are provided in the case 3 (including the end support wall 5 and the cylindrical protruding portion 11) and each shaft of the drive device 1.

2-2. Rotating Electrical Machine

As shown in FIG. 2, the rotating electrical machine MG is placed on the axial second direction A2 side with respect to the end support wall 5, and on the axial first direction A1 side with respect to the torque converter TC. The rotating electrical machine MG is also placed radially outside with respect to the input shaft I and the input clutch C1. The rotating electrical machine MG and the input clutch C1 are positioned so as to have an overlapping portion as viewed in the radial direction. Note that regarding arrangement of two members, the expression "having an overlapping portion as viewed in a certain direction" indicates that, when the certain direction serves as a viewing direction and a viewing point is moved in each direction perpendicular to the viewing direction, the viewing point from which the two members are seen to overlap each other is present at least in some region. The stator St of the rotating electrical machine MG is fixed to the case 3. The rotor Ro is placed radially inside the stator St. The rotor Ro is placed so as to face the stator St with a small gap interposed therebetween in the radial direction, and is rotatably supported by the case 3. Specifically, a rotor support member 22 that supports the rotor Ro and rotates together with the rotor Ro is rotatably supported with respect to the cylindrical protruding portion 11 of the case 3 via the first bearing 71. In the present embodiment, the rotor Ro corresponds to a "rotor main body" in the present invention.

As shown in FIGS. 2 to 4, the rotor support member 22 is a member that supports the rotor Ro of the rotating electrical machine MG from radially inside. The rotor support member 22 is placed on the axial first direction A1 side with respect to the input clutch C1. The rotor support member 22 is shaped to extend at least in the radial direction in order to support the rotor Ro with respect to the first bearing 71 that is placed radially inside with respect to the rotor Ro. In the present embodiment, the rotor support member 22 includes a rotor holding portion 23, a radially extending portion 24, and the support cylindrical portion 25.

The rotor holding portion 23 is a portion that holds the rotor Ro. The rotor holding portion 23 is placed coaxially with the central axis X, and is formed in an annular ring shape that contacts the inner peripheral surface and both axial side surfaces of the rotor Ro. The radially extending portion 24 is formed integrally with the rotor holding portion 23, and is formed so as to extend radially inward from a position near the axial center portion of the rotor holding portion 23. In this example, the radially extending portion 24 is an annular disc-shaped portion extending in the radial and circumferential directions. In this example, the radially extending portion 24 is in a flat plate shape having a substantially uniform thickness at any position in the radial and circumferential directions. First bolt insertion holes 24a are provided at a plurality of circumferential positions in the radially extending portion 24. First bolts 91 for fastening the rotor support member 22 and a cylindrical coupling member 32 together are inserted through the first bolt insertion holes 24a. In the present embodiment, the support cylindrical portion 25 is provided integrally at the inner end in the radial direction of the radially extending portion 24.

The support cylindrical portion 25 is a cylindrical portion placed coaxially with the central axis X and formed so as to extend toward both sides in the axial direction with respect to the radially extending portion 24. In the present embodiment, the first bearing 71 is placed on the inner peripheral surface of the support cylindrical portion 25, and the rotor support member 22 is supported by the first bearing 71 positioned between the inner peripheral surface of the support cylindrical portion 25 and the outer peripheral surface of the cylindrical protruding portion 11. Thus, the rotor support member 22 is rotatably supported by the outer peripheral surface of the cylindrical protruding portion 11 via the first bearing 71. Note that in this example, the first bearing 71 is press-fitted (interference-fitted) in the inner peripheral surface of the support cylindrical portion 25, and the first bearing 71 and the support cylindrical portion 25 are fixed to each other. On the other hand, the first bearing 71 is fitted (clearance-fitted) in the outer peripheral surface of the cylindrical protruding portion 11 so that the first bearing 71 is allowed to move in the axial direction to some degree.

The inner peripheral stepped portion 25b is provided at a predetermined axial position on the inner peripheral surface of the support cylindrical portion 25. With the inner peripheral stepped portion 25b serving as a boundary, a portion of the inner peripheral surface of the support cylindrical portion 25 on the axial first direction A1 side with respect to the inner peripheral stepped portion 25b serves as an inner peripheral smaller diameter portion, and a portion of the inner peripheral surface of the support cylindrical portion 25 on the axial second direction A2 side with respect to the inner peripheral stepped portion 25b serves as an inner peripheral larger diameter portion. The first bearing 71 is placed so as to contact the inner peripheral surface of the inner peripheral larger diameter portion and the side face of the inner peripheral stepped portion 25b on the axial second direction A2 side. Note that in the present embodiment, the inner peripheral stepped portion 25b is formed on the axial first direction A1 side with respect to the radially extending portion 24. The first bearing 71 is positioned so as to have a portion overlapping the radially extending portion 24 as viewed in the radial direction.

An outer peripheral stepped portion 25c is provided on the outer peripheral surface of the support cylindrical portion 25 at a predetermined position located on the axial first direction A1 side with respect to the radially extending portion 24. With the outer peripheral stepped portion 25c serving as a boundary, a portion of the outer peripheral surface of the support cylindrical portion 25 on the axial first direction A1 side with respect to the outer peripheral stepped portion 25c serves as an outer peripheral smaller diameter portion, and a portion the outer peripheral surface of the support cylindrical portion 25 on the axial second direction A2 side with respect to the outer peripheral stepped portion 25c serves as an outer peripheral larger diameter portion. Note that the outer peripheral stepped portion 25c is provided on the axial first direction A1 side with respect to the inner peripheral stepped portion 25b. The support cylindrical portion 25 is formed integrally with the radially extending portion 24 in the outer peripheral larger diameter portion. A sensor rotor 13b of a rotation sensor 13 is attached so as to contact the outer peripheral surface of the outer peripheral smaller diameter portion and the side face located on the axial first direction A1 side with respect to the outer peripheral stepped portion 25c. A sensor stator 13a is placed radially outside the sensor rotor 13b so as to face the sensor rotor 13b with a small gap interposed therebetween in the radial direction. As shown in FIG. 2, the sensor stator 13a is fixed to a predetermined sensor stator attachment portion formed on the end support wall 5. Note that the rotation sensor 13 is a sensor that detects the rotation position of the rotor Ro with respect to the stator St of the rotating electrical machine MG, and in this example, a resolver is used as the rotation sensor 13.

In the present embodiment, a cylindrical portion of the support cylindrical portion 25, which is located on the axial second direction A2 side with respect to the radially extending portion 24, is a fitting protruding portion 25a. That is, the rotor support member 22 has the cylindrical fitting protruding portion 25a that protrudes in the axial second direction A2 from the radially extending portion 24. The fitting protruding portion 25a extends in the axial direction with at least a length equal to or greater than a required fitting length. As described later, a cylindrical extending portion 32d of the cylindrical coupling member 32 is fitted on the fitting protruding portion 25a so as to be in contact therewith in the radial direction.

In the present embodiment, a third seal member 83 is placed between the rotor support member 22 and the cylindrical protruding portion 11 at a position on the axial first direction A1 side with respect to the first bearing 71. In this example, the third seal member 83 is placed between the inner peripheral smaller diameter portion of the support cylindrical portion 25 and the larger diameter portion of the cylindrical protruding portion 11. The third seal member 83 seals between the support cylindrical portion 25 and the cylindrical protruding portion 11, and prevents oil from reaching the rotation sensor 13, the stator St of the rotating electrical machine MG; etc. after lubricating the first bearing 71, etc. Note that the first bearing 71 is placed in a space defined by the outer peripheral surface of the cylindrical protruding portion 11, the inner peripheral surface of the support cylindrical portion 25, and the third seal member 83. In the present embodiment, this space is referred to as the "bearing placement space P."

2-3. Input Clutch

The input clutch C1 is a friction engagement device that selectively drivingly couples the input shaft I to the rotating electrical machine MG and the torque converter TC. The input clutch C1 is structured as a wet multiple disc clutch mechanism. As shown in FIG. 2, the input clutch C1 is placed between the rotor support member 22 and the torque converter TC in the axial direction. That is, the input clutch C1 is placed on the axial second direction A2 side with respect to the rotor support member 22 and on the axial first direction A1 side with respect to the torque converter TC. The input clutch C1 is placed between the cylindrical protruding portion 11 and the rotor Ro of the rotating electrical machine MG in the radial direction. That is, the input clutch C1 is placed radially outside the cylindrical protruding portion 11, and radially inside the rotor Ro. The cylindrical protruding portion 11, the input clutch C1, and the rotor Ro are positioned so as to have a portion overlapping each other as viewed in the radial direction. The input clutch C1 includes a clutch hub 31, the cylindrical coupling member 32, a friction member 33, a piston 34, and the hydraulic oil pressure chamber H1.

The input clutch C1 has an input-side friction member and an output-side friction member in a pair as the friction member 33. In this example, the input clutch C1 has a plurality of (two in this example) input-side friction members and a plurality of (two in this example) output-side friction members, which are alternately arranged in the axial direction. Each of the plurality of friction members 33 is in an annular disc shape.

The clutch hub 31 is an annular disc-shaped member extending in the radial direction so as to support the plurality of input-side friction members (in this example, hub-side friction members) from radially inside. The clutch hub 31 is formed so as to extend in the radial direction between the piston 34 and a cover portion 42, which will be described later, of the torque converter TC in the axial direction. The inner end in the radial direction of the clutch hub 31 is coupled to the input shaft I. The input shaft I has a flange portion Ia extending radially outward between the cylindrical protruding portion 11 and the cover portion 42 in the axial direction. The outer end in the radial direction of the flange portion Ia is bonded and coupled to the inner end in the radial direction of the clutch hub 31 by welding, etc. Thus, the input shaft I is coupled to the clutch hub 31 so as to rotate together therewith, and the input shaft I and the clutch hub 31 form an "input transmission member." Note that the clutch hub 31 is a member to which the rotation and torque of the internal combustion engine E is transmitted via the input shaft I, and is an input-side rotating member of the input clutch C1 In the present embodiment, the clutch hub 31 corresponds to an "engagement input-side member" in the present invention. The flange portion Ia of the input shaft I corresponds to an "input-side radially extending portion" in the present invention.

The cylindrical coupling member 32 is a substantially cylindrical member formed so as to cover at least the outer sides in the radial direction of the plurality of friction members 33, and to support the output-side friction members (in this example, drum-side friction members) from radially outside. The cylindrical coupling member 32 is structured so as to function as a clutch drum of the input clutch C1. The cylindrical coupling member 32 has a portion formed in a bowl shape as a whole so as to further cover the piston 34 on the axial first direction A1 side and the piston 34 on the radial outer side. In the present embodiment, the cylindrical coupling member 32 is structured as a separate member independent of the rotor support member 22 and the cover portion 42 of the torque converter TC. The cylindrical coupling member 32 is coupled to the rotor support member 22, and to the cover member 42. The cylindrical coupling member 32 is an output-side rotating member of the input clutch C1, which is paired with the clutch hub 31 and transmits the rotation and torque, which are input to the clutch hub 31 when the input clutch C1 is in an engaged state, to the torque converter TC located on the output shaft O side. In the present embodiment, the cylindrical coupling member 32 corresponds to an "engagement output-side member" in the present invention.

As shown in FIGS. 3 and 4, the cylindrical coupling member 32 as the clutch drum includes an axially extending portion 32a, a radially extending portion 32b, a cylindrical extending portion 32d, a cylindrical protruding portion 32e, and a radially extending portion 32f. The axially extending portion 32a is placed coaxially with the central axis X, and is formed in a cylindrical shape so as to extend in a predetermined range in the axial direction. The axially extending portion 32a is formed along the axial direction so as to contact at least the radially extending portion 24 of the rotor support member 22 on the axial first direction A1 side, and to contact at least the cover portion 42 of the torque converter TC on the axial second direction A2 side. As described later, the cover portion 42 is fitted in the axially extending portion 32a so as contact the axially extending portion 32a in the radial direction. The axially extending portion 32a is placed so as to face the rotor holding portion 23 of the rotor support member 22 with a predetermined gap interposed therebetween in the radial direction. The radially extending portion 32f is formed integrally with the axially extending portion 32a, and is formed in an annular disc shape so as to extend radially outward from the end of the axially extending portion 32a located on the axial second direction A2 side. Second bolt insertion holes 32g are provided at a plurality of circumferential positions of the radially extending portion 32f. Second bolts 92 for fastening the cover portion 42 and the cylindrical coupling member 32 together are inserted through the second bolt insertion holes 32g. The radially extending portion 32f is positioned radially inside a coil end portion Ce located on the axial second direction A2 side of the stator St, so as to have a portion overlapping the coil end portion Ce as viewed in the radial direction. The radially extending portion 32f is positioned on the axial second direction A2 side of the rotor Ro so as to have a portion overlapping the rotor Ro as viewed in the axial direction.

The radially extending portion 32b is formed integrally with the axially extending portion 32a, and is formed substantially in an annular disc shape so as to extend radially inward from the end on the axial first direction A1 side of the axially extending portion 32a. A coupling portion between the axially extending portion 32a and the radially extending portion 32b is a thick portion having a predetermined thickness in the axial and radial directions, and this thick portion serves as an attachment portion 32c for attaching the cylindrical coupling member 32 and the rotor support member 22 together. First bolt holes for fastening the first bolts 91 therein are provided at a plurality of circumferential positions of the attachment portion 32c. The radially extending portion 32b has the cylindrical extending portion 32d at a position radially inside the attachment portion 32c, and the cylindrical extending portion 32d is formed integrally with the radially extending portion 32b, and extends in the axial direction. That is, the radially extending portion 32b is shaped so that a portion located radially inside the cylindrical extending portion 32d is offset toward the axial second direction A2 side with respect to a portion located radially outside the cylindrical extending portion 32d. The cylindrical extending portion 32d is fitted on the fitting protruding portion 25a of the rotor support member 22 so as to be in contact therewith in the radial direction. The cylindrical protruding portion 32e is formed integrally with the radially extending portion 32h, and is formed in a cylindrical shape so as to protrude from the inner end in the radial direction of the radially extending portion 32b at least toward the axial second direction A2 side. In this example, the cylindrical protruding portion 32e extends to both sides in the axial direction from the radially extending portion 32b. A sleeve 86 is placed on the inner peripheral surface of the cylindrical protruding portion 32e so that the sleeve 86 contacts the cylindrical protruding portion 32e. Note that in the present embodiment, the case 3 including the cylindrical protruding portion 11 is made of aluminum, and the cylindrical coupling member 32 including the cylindrical protruding portion 32e is made of iron. Thus, the sleeve 86 is made of iron in order to suppress wear of the cylindrical protruding portion 11 due to relative rotation between the cylindrical protruding portion 11 of the case 3 and the cylindrical protruding portion 32e of the cylindrical coupling member 32.

The piston 34 for pressing the friction members 33 in a pressing direction is positioned so as to be slidable in the axial direction along the outer peripheral surface of the cylindrical extending portion 32d and the outer peripheral surface of the cylindrical protruding portion 32e. In the present embodiment, the piston 34 is placed on the axial first direction A1 side with respect to the friction member 33, and the axial second direction A2 corresponds to the pressing direction. Seal members such as O-rings are positioned between the cylindrical extending portion 32d and the piston 34, and between the cylindrical protruding portion 32e and the piston 34, respectively. Thus, the hydraulic oil pressure chamber H1 is formed as a space defined and sealed by the radially extending portion 32b, the cylindrical extending portion 32d, the cylindrical protruding portion 32e, and the piston 34. Oil for operating the piston 34 is supplied to the hydraulic oil pressure chamber H1 through the first oil passage L1. The piston 34 slides in the axial direction according to the oil pressure level of the oil supplied to the hydraulic oil pressure chamber H1, and an engagement pressure for pressing the plurality of friction members 33 against each other is increased or decreased accordingly, whereby engagement and disengagement of the input clutch C1 are controlled.

The circulating oil pressure chamber H2 is formed on the opposite side of the piston 34 from the hydraulic oil pressure chamber H1 (in this example, on the axial second direction A2 side). The circulating oil pressure chamber H2 is formed as a space defined mainly by the piston 34, the axially extending portion 32a, the cover portion 42 of the torque converter TC, the cylindrical protruding portion 11, and the aforementioned input transmission member (the input shaft I and the clutch hub 31). In the present embodiment, a first seal member 81 is placed between the axially extending portion 32a and the cover portion 42 to seal therebetween. Moreover, a second seal member 82 is placed between the cylindrical protruding portion 11 and the input shaft I of the input transmission member to seal therebetween. Thus, the circulating oil pressure chamber H2 is formed as a sealed space. Pressure oil discharged from the oil pump 9 and adjusted to a predetermined oil pressure level by a hydraulic control device (not shown) is supplied to the circulating oil pressure chamber H2 through the second oil passage L2.

The end of the cylindrical protruding portion 11 on the axial second direction A2 side is located in the circulating oil pressure chamber H2. The flange portion Ia of the input shaft I that is inserted through the cylindrical protruding portion 11 on the radially inner side thereof is also located in the circulating oil pressure chamber H2 so as to extend radially outside on the axial second direction A2 side of the cylindrical protruding portion 11. Moreover, the clutch hub 31 coupled to the flange portion Ia is located in the circulating oil pressure chamber H2 so as to extend in the radial direction, and the plurality of friction members 33 are also located in the circulating oil pressure chamber H2. Since the oil is supplied to the circulating oil pressure chamber H2 through the second oil passage L2, the circulating oil pressure chamber H2 is basically filled with the oil having a predetermined pressure or more, and in the present embodiment, the plurality of friction members 33 can be efficiently cooled by the oil contained in the circulating oil pressure chamber H2. After cooling the plurality of friction members 33, the oil is discharged through the third oil passage L3 and a fifth oil passage L5 formed in the input shaft I, and is returned to the oil pan (not shown). Note that in the present embodiment, the hydraulic oil pressure chamber H1 and the circulating oil pressure chamber H2 are formed as spaces independent of a main body accommodating chamber H4, which will be described later, in the torque converter TC.

2-4. Torque Converter

As shown in FIG. 2, the torque converter TC is placed on the axial second direction A2 side with respect to the rotating electrical machine MG and the input clutch C1, and on the axial first direction A1 side with respect to the intermediate support wall 6 and the speed change mechanism TM. The torque converter TC includes the pump impeller 41, the turbine runner 51, the stator 56, and the cover portion 42 that accommodates these elements.

The cover portion 42 is structured so as to rotate together with the pump impeller 41. In this example, the pump impeller 41 is integrally provided inside the cover portion 42. The cover portion 42 is coupled to the cylindrical coupling member 32. Thus, the cover portion 42 is drivingly coupled to the rotor Ro of the rotating electrical machine MG via the cylindrical coupling member 32 and the rotor support member 22 so as to rotate together with the rotor Ro. Thus, the pump impeller 41 and the cover member 42, which rotate together, are members to which the rotation and torque of one or both of the internal combustion engine E and the rotating electrical machine MG are transmitted, and is an input-side rotating member of the torque converter TC. The cover portion 42 is also coupled to the pump drive shaft 47. The cover portion 42 is drivingly coupled to pump rotors of the oil pump 9 via the pump drive shaft 47 so as to rotate together with the pump rotors. The pump drive shaft 47 is rotatably supported in the radial direction by the pump cover 7 via a third bearing 73 provided in a through hole of the pump cover 7. In the present embodiment, the pump impeller 41, the cover portion 42, and the pump drive shaft 47 form a "coupling input-side member" in the present invention.

The turbine runner 51 is placed on the axial first direction A1 side of the pump impeller 41 so as to face the pump impeller 41. The turbine runner 51 is an output-side rotating member of the torque converter TC, which is paired with the pump impeller 41 and transmits the rotation and torque, which are input to the pump impeller 41, to the intermediate shaft M located on the output shaft O side. In the present embodiment, the turbine runner 51 corresponds to a "coupling output-side member" in the present invention. The turbine runner 51 has a radially extending portion 52 that extends in the radial direction. The radially extending portion 52 is placed between a cylindrical extending portion 46, which will be described later, and a one-way clutch 57 in the axial direction. The turbine runner 51 has a cylindrical protruding portion 53 (see FIG. 3) that is formed integrally with the radially extending portion 52, and that protrudes in the axial first direction A1 from the radially inner end of the radially extending portion 52. In the present embodiment, the cylindrical protruding portion 53 is spline coupled to the intermediate shaft M placed so as to extend through the cylindrical protruding portion 53. Thus, in the present embodiment, the turbine runner 51 and the intermediate shaft M are drivingly coupled together so as to be movable relative to each other in the axial direction, and so as to rotate together with a certain amount of backlash (play) in the circumferential direction. Note that in the present embodiment, the radially extending portion 52 and the cylindrical protruding portion 53, which are formed integrally, form an "output-side radially extending portion" in the present invention.

The stator 56 is placed between the pump impeller 41 and the turbine runner 51 in the axial direction. The stator 56 is supported by the fixed shaft 58 via the one-way clutch 57. As described above, the fixed shaft 58 is a cylindrical shaft portion, and is fixed to the intermediate support wall 6 of the case 3 on the axial second direction A2 side. Thus, the stator 56 is coupled to the intermediate support wall 6 via the one-way clutch 57 and the fixed shaft 58. The one-way clutch 57 is placed between the radially extending portion 52 and the pump drive shaft 47 in the axial direction.

In the present embodiment, the pump impeller 41 and the turbine runner 51, which are placed so as to face each other, form a main body of the torque converter TC. The cover portion 42, which holds the pump impeller 41 from outside, is placed so as to further accommodate the turbine runner 51. That is, the cover portion 42 is placed so as to accommodate the main body of the torque converter TC. In the present embodiment, the lockup clutch C2 and a second damper 54, which are placed on the axial first direction A1 side with respect to the main body of the torque converter TC, are also accommodated in the cover portion 42. In the present embodiment, the space in the cover portion 42 in which the main body, etc. are accommodated is referred to as the "main body accommodating chamber H4." The cover portion 42 is formed so as to cover both sides in the axial direction and outer sides in the radial direction of the main body, the lockup clutch C2, and the second damper 54. Thus, as shown in FIGS. 3 and 4, the cover portion 42 has an outer radially extending portion 43, an axially extending portion 44, an inner radially extending portion 45, and the cylindrical extending portion 46, on the axial first direction A1 side with respect to the main body.

The axially extending portion 44 is a cylindrical portion extending in a predetermined range along the axial direction. The axially extending portion 44 is provided approximately at an intermediate position of a region occupied in the radial direction by a portion of the cover portion 42 located on the axial first direction A1 side with respect to the main body. The axially extending portion 44 is fitted in the axially extending portion 32*a* so that the axially extending portion 44 contacts the axially extending portion 32*a* in the radial direction. The outer radially extending portion 43 is formed integrally with the axially extending portion 44, and is formed in an annular disc shape so as to extend radially outward from the end of the axially extending portion 44 on the axial second direction A2 side. The outer radially extending portion 43 is placed so as to extend in the radial direction between the rotating electrical machine MG and the second damper 54 in the axial direction. The inner radially extending portion 45 is formed integrally with the axially extending portion 44, and is formed substantially in a disc shape so as to extend radially inward from the end of the axially extending portion 44 on the axial first direction A1 side. The inner radially extending portion 45 is placed so as to extend in the radial direction between the input clutch C1 and the lockup clutch C2 in the axial direction. The radial central portion of the inner radially extending portion 45 is positioned between the input shaft I and the intermediate shaft M in the axial direction. Note that the cover portion 42 is formed in a stepped bowl shape as a whole by a cylindrical portion that covers the outer side of the second damper 54 in the radial direction, and by the outer radially extending portion 43, the axially extending portion 44, and the inner radially extending portion 45.

The cylindrical extending portion 46 is formed integrally with the inner radially extending portion 45, and is formed in a cylindrical shape so as to extend toward the axial second direction A2 side from the radial central portion of the inner radially extending portion 45. In the present embodiment, a stepped portion 46*a* is provided at a predetermined axial position on the inner peripheral surface of the cylindrical extending portion 46. With the stepped portion 46*a* serving as a boundary, a portion of the inner peripheral surface of the cylindrical extending portion 46 on the axial first direction A1 side with respect to the stepped portion 46*a* serves as a smaller diameter portion, and a portion of the inner peripheral surface of the cylindrical extending portion 46 on the axial second direction A2 side with respect to the stepped portion 46*a* serves as a larger diameter portion. The end of the intermediate shaft M on the axial first direction A1 side is placed radially inside the smaller diameter portion. The cylindrical protruding portion 53 of the turbine runner 51 is placed at a position radially inside the larger diameter portion and radially outside the intermediate shaft M. The cylindrical extending portion 46 is placed on the axial first direction A1 side with respect to the one-way clutch 57 and the radially extending portion 52 of the turbine runner 51. In the present embodiment, the cylindrical extending portion 46 corresponds to a "first direction-side support portion" in the present invention.

The lockup clutch C2 is a friction engagement device that selectively drivingly couples the pump impeller 41, which rotates together with the cover portion 42, to the turbine runner 51. The lockup clutch C2 is structured as a wet multiple disc clutch mechanism. The lockup clutch C2 is positioned radially inside the axially extending portion 44 of the cover portion 42 so as to have a portion overlapping the axially extending portion 44 as viewed in the radial direction. The lockup clutch C2 is positioned on the axial first direction A1 side with respect to the turbine runner 51. The lockup clutch C2 is placed adjacent to the input clutch C1 on the axial second direction A2 side with the inner radially extending portion 45 of the cover portion 42 interposed therebetween. As shown in FIGS. 3 and 4, the lockup clutch C2 includes a clutch hub 61, a clutch drum 62, friction members 63, a piston 64, and a hydraulic oil pressure chamber H3.

The clutch hub 61 is provided so as to rotate together with the cylindrical extending portion 46 of the cover portion 42. The clutch drum 62 is drivingly coupled to the turbine runner 51 and the intermediate shaft M via the second damper 54. The plurality of friction members 63 are placed between the clutch hub 61 and the clutch drum 62, and the piston 64 is placed on the axial first direction A1 side with respect to the friction members 63. The piston 64 is placed so as to be slidable in the axial direction along the axially extending portion 44 and the cylindrical extending portion 46 of the cover portion 42. Seal members such as O-rings are placed between the axially extending portion 44 and the piston 64, and between the cylindrical extending portion 46 and the piston 64, respectively. Thus, the hydraulic oil pressure chamber H3 is formed as a space defined and sealed by the axially extending portion 44, the inner radially extending portion 45, the cylindrical extending portion 46, and the piston 46. Oil for operating the piston 64 is supplied to the hydraulic oil pressure chamber H3 via an internal oil passage formed in the intermediate shaft M. The piston 64 slides in the axial direction according to the oil pressure level of the oil supplied to the hydraulic oil pressure chamber H3, and an engagement pressure for pressing the plurality of friction members 63 against each other is increased or decreased accordingly, whereby engagement and disengagement of the lockup clutch C2 are controlled.

2-5. Power Transmission Member

The power transmission member T is a member that transmits rotation and torque from the driving force source of the vehicle to the speed change mechanism TM. In the present embodiment, the rotation and torque from the driving force source of the vehicle are transmitted to the speed change mechanism TM via the torque converter TC by transmitting the rotation and torque to the pump impeller 41 of the torque converter TC. Thus, the power transmission member T of the present embodiment is structured by coupling the rotor support member 22 of the rotating electrical machine MG, the cylindrical coupling member 32 as the output-side rotating member of the input clutch C1, and the cover portion 42 of the torque converter TC so that these elements rotate together.

The rotor support member 22 and the cylindrical coupling member 32 are coupled together so as to contact each other at least at two locations, namely at a first radially fitting portion J1 and a first fixedly fastened portion F1 in this example. The first radially fitting portion J1 is a portion for positioning the rotor support member 22 and the cylindrical coupling member 32 relative to each other in the radial direction. In the present embodiment, each of the fitting protruding portion 25a provided in the rotor support member 22 and the cylindrical extending portion 32d provided in the cylindrical coupling member 32 has a portion extending in the axial direction. In this example, the outer peripheral surface of the fitting protruding portion 25a and the inner peripheral surface of the cylindrical extending portion 32d are fitted on each other so as to contact each other along the entire circumference, whereby the rotor support member 22 and the cylindrical coupling member 32 are positioned relative to each other in the radial direction. Thus, in the present embodiment, the fitting protruding portion 25a and the cylindrical extending portion 32d form the first radially fitting portion J1.

The first fixedly fastened portion F1 is a portion for fixedly fastening the rotor support member 22 and the cylindrical coupling member 32 together. In the present embodiment, the radially extending portion 24 of the rotor support member 22 and the attachment portion 32c of the cylindrical coupling member 32 are placed so as to contact each other in the axial direction. The radially extending portion 24 and the attachment portion 32c are placed so that all the central axes of the plurality of first bolt insertion holes 24a provided in the radially extending portion 24 match the central axes of the plurality of first bolt holes provided in the attachment portion 32c. The first bolts 91 are inserted through the first bolt insertion holes 24 and fastened in the first bolt holes, respectively. Thus, the radially extending portion 24 and the attachment portion 32c are fixedly fastened together by the first bolts 91, and the fastened portion between the radially extending portion 24 and the attachment portion 32c forms the first fixedly fastened portion F1. The rotor support member 22 and the cylindrical coupling member 32 are firmly fixed together by the first fixedly fastened portion F1 with no looseness. Note that in this example, a plurality of sets of the first bolts 91, the first bolt insertion holes 24a, and the first bolt holes are placed so as to be distributed in the circumferential direction. Thus, the "first fixedly fastened portion F1" is herein used as a term that generally refers to the plurality of sets (the same applies to a second fixedly fastened portion F2 described later).

The cylindrical coupling member 32 and the cover member 42 are coupled together so as to contact each other at least at two locations, namely at a second radially fitting portion J2 and a second fixedly fastened portion F2. The second radially fitting portion J2 is a portion for positioning the cylindrical coupling member 32 and the cover portion 42 relative to each other in the radial direction. In the present embodiment, each of the axially extending portion 32a provided in the cylindrical coupling member 32 and the axially extending portion 44 provided in the cover portion 42 has a portion extending in the axial direction. In this example, the inner peripheral surface of the axially extending portion 32a and the outer peripheral surface of the axially extending portion 44 are fitted on and contact each other along the entire circumference, whereby the cylindrical coupling member 32 and the cover member 42 are positioned relative to each other in the radial direction. Thus, in the present embodiment, the axially extending portion 32a of the cylindrical coupling member 32 and the axially extending portion 44 of the cover portion 42 form the second radially fitting portion J2. Note that in the present embodiment, the first seal member 81 is placed between the axially extending portion 32a and the axially extending portion 44. Thus, a common structure is used as the structure (the second radially fitting portion J2) for positioning the cylindrical coupling member 32 and the cover portion 42 relative to each other in the radial direction, and the structure for sealing the circulating oil pressure chamber H2.

The second fixedly fastened portion F2 is a portion for fixedly fastening the cylindrical coupling member 32 and the cover member 42 together. In the present embodiment, the radially extending portion 32f of the cylindrical coupling member 32 and the outer radially extending portion 43 of the cover portion 42 are placed so as to contact each other via cover-side coupling portions 43a provided at a plurality of circumferential positions. That is, the radially extending portion 32f contacts the cover-side coupling portions 43a in the axial direction, and that the cover-side coupling portions 43a contact the outer radially extending portion 43 in the axial direction. Note that second bolt holes for fastening the second bolts 92 therein are provided in the cover-side coupling portions 43a, respectively. The cover-side coupling portions 43a are each bonded to the side face of the outer radially extending portion 43 located on the axial first direction A1 side by welding, etc., so as to rotate together with the cover portion 42. The radially extending portion 32f, the cover-side coupling portions 43a, and the outer radially extending portion 43 are placed so that all the central axes of the plurality of second bolt insertion holes 32g provided in the radially extending portion 32f match the central axes of the second bolt holes provided in the plurality of cover-side coupling portions 43a. The second bolts 92 are inserted through the second bolt insertion holes 32g and fastened in the second bolt holes, respectively. Thus, the radially extending portion 32f and the cover-side coupling portions 43a are fixedly fastened together by the second bolts 92, and the radially extending portion 32f and the outer radially extending portion 43 are coupled together via the cover-side coupling portions 43a. In the present embodiment, the fastened portion between the radially extending portion 32f and the outer radially extending portion 43 forms the second fixedly fastened portion F2. The cylindrical coupling member 32 is firmly fixed to the cover member 42 and the pump impeller 41 by the second fixedly fastened portion F2 with no looseness.

Note that in the present embodiment, the first radially fitting portion J1 is provided radially inside the first fixedly fastened portion F1. In the present embodiment, the first radial fitting portion J1 is formed by using a part of the support cylindrical portion 25 located at the inner end in the radial direction of the rotor support member 22, and the first fixedly fastened portion F1 is provided in a radially outer portion (a portion near the rotor holding portion 23) of the radially extending portion 24 of the rotor support member 22. This enables the fitting protruding portion 25a and the cylindrical extending portion 32d, which form the first radial fitting portion J1, to have a relatively small diameter. This makes it easier to increase processing accuracy of the fitting protruding portion 25a and the cylindrical extending portion 32d. Moreover, as compared to the case where the first fixedly fastened portion F1 is provided radially inside, the maximum value of the torque that can be transmitted via the first bolts 91 in the first fixedly fastened portion F1 can be increased by the principle of leverage. The second radial fitting portion J2 is provided radially inside the second fixedly fastened portion F2. In this example, the second radial fitting portion J2 is positioned adjacent to the second fixedly fastened portion F2 in the radial direction.

In the present embodiment, the rotor support member 22, the cylindrical coupling member 32, and the cover portion 42 are formed as separate members that are independent of each other. Thus, these members can be individually processed, which also makes it easier to process each member into a desired shape and to increase processing accuracy. In particular, it is easier to increase centering accuracy of the central axes of the fitting protruding portion 25a and the cylindrical extending portion 32d of the first radial fitting portion J1, and the axially extending portion 32a and the axially extending portion 44 of the second radial fitting portion J2, for which centering accuracy of the central axes is required. Thus, the first fixedly fastened portion F1 and the second fixedly fastened portion F2 operate together with the first radial fitting portion J1 and the second radial fitting portion J2, whereby the integral power transmission member T, which is firmly coupled and fixed with no looseness with high centering accuracy of the central axes, is formed as a rotating member in a drum shape as a whole.

As shown in FIG. 2, etc., on the axial first direction A1 side, the power transmission member T thus formed is rotatably supported, via the first bearing 71, in the radial direction by the outer peripheral surface of the cylindrical protruding portion 11 formed integrally with the end support wall 5. Note that in the present embodiment, the input shaft I, which is placed so as to extend through the cylindrical protruding portion 11, is rotatably supported in the radial direction by the inner peripheral surface of the cylindrical protruding portion 11 via two second bearings 72 that are positioned spaced apart from each other in the axial direction by a predetermined distance. On the axial second direction A2 side, however, the power transmission member T is rotatably supported, via the third bearing 73, in the radial direction by the inner peripheral surface of the through hole of the pump cover 7 attached to the inner support wall 6. Bearings capable of receiving a radial load are used as the second bearing 72 and the third bearing 73, and needle bearings are used in this example.

3. Support Structures for Supporting Each Constituent Member in Axial Direction Support structures for supporting each constituent member in the axial direction will be described below. The support structures for supporting the torque converter TC and the power transmission member T in the axial direction will be mainly described below.

As described above, the stator 56 of the torque converter TC is supported by the fixed shaft 58 via the one-way clutch 57. The radially extending portion 52 of the turbine runner 51 is placed on the axial first direction A1 side with respect to the one-way clutch 57, and the pump drive shaft 47, which rotates together with the pump impeller 41, is placed on the axial second direction A2 side with respect to the one-way clutch 57. As shown in FIG. 2, a seventh bearing 77 is placed between the radially extending portion 52 and the one-way clutch 57 in the axial direction, and an eighth bearing 78 is placed between the one-way clutch 57 and the pump drive shaft 47 in the axial direction. Unlike the first bearing 71, bearings capable of receiving an axial load are used as the seventh bearing 77 and the eighth bearing 78, and thrust bearings are used in this example.

When the lockup clutch C2 is in a disengaged state, there may be a difference in rotational speed between the pump impeller 41 and the turbine runner 51. In this case, a negative pressure is generated between the pump impeller 41 and the turbine runner 51 in the main body accommodating chamber H4 of the torque converter TC due to the difference in rotational speed, thereby generating an attractive force that is applied in such a direction that attracts the pump impeller 41 and the turbine runner 51 toward each other. At this time, in the present embodiment, the cylindrical protruding portion 53 of the turbine runner 51 is spline coupled to the intermediate shaft M, so that the cylindrical protruding portion 53 and the intermediate shaft M are movable relative to each other in the axial direction. Thus it is considered that, if such an attractive force is generated, the turbine runner 51 are basically more likely to move to the axial second direction A2 side toward the pump impeller 41. In this case, the one-way clutch 57 is supported in the axial direction by the pump drive shaft 47 from the axial second direction A2 side via the eight bearing 78, and the radially extending portion 52 is supported in the axial direction by the one-way clutch 57 from the axial second direction A2 side via the seventh bearing 77. Thus, the drive device 1 of the present embodiment is structured so that an axial load, associated with axial movement of the turbine runner 51 toward the axial second direction A2 side due to the attractive force, is basically received in the torque converter TC.

In some cases, however, the cylindrical protruding portion 53 of the turbine runner 51 and the intermediate shaft M, which are spline coupled together, may not be able to move relative to each other in the axial direction as desired. For example, in the case where relatively large torque is transmitted between the cylindrical protruding portion 53 and the intermediate shaft M in order to increase the rotational speed of the intermediate shaft M, large torque is applied to the spline coupling portion therebetween. Thus, slipping is less likely to occur in the spline coupling portion, which may hinder axial movement of the turbine runner 51 toward the pump impeller 41. If the attractive force is generated in this case, the pump impeller 41 moves toward the axial first direction A1 side, which is the turbine runner 51 side. In the present embodiment, the rotor support member 22, the cylindrical coupling member 32, and the cover portion 42 that rotates together with the pump impeller 41 are fixedly coupled together to form the power transmission member T. Thus, if such a phenomenon occurs, the entire power transmission member T moves toward the axial first direction A1 side. Thus, an axial load may be applied to the first bearing 71 via the power transmission member T.

If the rotational speeds of the pump impeller 41 and the turbine runner 51 increase, the cover portion 42 may be deformed so as to expand in the axial direction due to a centrifugal force that is applied to the oil contained in the main body accommodating portion H4. In this case, the amount of movement of the power transmission member T toward the axial first direction A1 side is further increased by the deformation of the cover member 42. This increases the possibility that the axial load may be applied to the first bearing 71 via the power transmission member T.

In order to prevent the axial load from being applied to the first bearing 71, the drive device 1 of the present embodiment is provided with a movement restricting mechanism R that restricts axial movement of the power transmission member T toward the axial first direction A1 side. As shown in FIG. 3, in the present embodiment, such a movement restricting mechanism R has the cylindrical protruding portion 11 provided on the end support wall 5 of the case 3, two bearings separate from the first bearing 71, namely a fourth bearing 74 and a fifth bearing 75. The cylindrical protruding portion 11 functions as a support member that supports the two bearings 74, 75 in the axial direction from the axial first direction A1 side. Thus, in the present embodiment, the cylindrical protruding portion 11 corresponds to an "axial support portion" in the present invention.

In the present embodiment, the input clutch C1 is provided between the input shaft I and the power transmission member T on the power transmission path, and the flange portion Ia of the input shaft I is formed so as to extend in the radial direction, and is coupled to the clutch hub 31 of the input clutch C1. At this time, the flange portion Ia extends in the radial direction between the cylindrical protruding portion 11 and the cover member 42 in the axial direction. The fourth bearing 74 is placed between the cylindrical protruding portion 11 and the flange portion Ia in the axial direction via the sleeve 86 fitted on the outer peripheral surface of the cylindrical protruding portion 11, and the fifth bearing 75 is placed between the flange portion Ia and the cover portion 42 in the axial direction. More specifically, the fourth bearing 74 is placed so as to contact both the sleeve 86 fitted on the cylindrical protruding portion 11 and the flange portion Ia, and the fifth bearing 75 is placed so as to be slightly separated from the flange portion Ia, and to contact the cover portion 42. Unlike the first bearing 71, bearings capable of receiving an axial load are used as the fourth bearing 74 and the fifth bearing 75, and thrust bearings are used in this example. In the present embodiment, the fourth bearing 74 and the fifth bearing 75 correspond to a "restricting bearing" in the present invention.

In the present embodiment, if a load that tries to move the power transmission member T toward the axial first direction A1 side is applied to the power transmission member T, the flange portion Ia of the input shaft I is supported in the axial direction by the cylindrical protruding portion 11 and the sleeve 86 via the fourth bearing 74 from the axial first direction A1 side. Note that the sleeve 86 is placed at the end of the cylindrical protruding portion 11 on the axial second direction A2 side so as to contact the side face of the second stepped portion 11*c* of the cylindrical protruding portion 11 on the axial second direction A2 side, and can operate together with the cylindrical protruding portion 11 to appropriately receive the axial load. The cover portion 42 is supported, via the fifth bearing 75, in the axial direction from the axial first direction A1 side by the flange portion Ia of the input shaft I axially supported as described above.

Thus, in the present embodiment, the cover portion 42 that forms the power transmission member T is rotatably supported in the axial direction by the fourth bearing 74 and the fifth bearing 75 that are supported at the end of the cylindrical protruding portion 11 on the axial second direction A2 side. Thus, the axial load that is applied to the power transmission member T can be received by the cylindrical protruding portion 11 of the case 3 via the fourth bearing 74 and the fifth bearing 75. Accordingly, even if the axial load is applied to the power transmission member T, application of the axial load to the first bearing 71 can be suppressed. Thus, the first bearing 71 is not required to have such capability that can resist such axial load, whereby an increase in size of the first bearing 71 can be suppressed. This can reduce the size of the drive device 1 and can suppress an increase in manufacturing cost.

As described above, in the present embodiment, the first bearing 71 is press-fitted in, and fixed to the support cylindrical portion 25 of the rotor support member 22 that forms the power transmission member T, and is fitted on the cylindrical protruding portion 11 so as to be allowed to move in the axial direction to some degree. Moreover, the first bearing 71 is placed so as to be separated from the side face of the first stepped portion 11*b* formed in the cylindrical protruding portion 11, which is located on the axial second direction A2 side. Thus, even if the power transmission member T is moved toward the axial first direction A1 side by the axial load, the first bearing 71 does not contact the first stepped portion 11*b* while the amount of movement of the power transmission member T is smaller than a first clearance D1 (see FIG. 5) between the side face of the first stepped portion 11*b* located on the axial second direction A2 side and the side face of the first bearing 71 on the axial first direction A1 side. Note that the first clearance D1 is defined as having a size in the state in which the first bearing 71 contacts the snap ring 94, and is equal to the distance by which the power transmission member T is movable relative to the case 3 in the axial direction in a region where the first bearing 71 as a support bearing is provided.

As described above, the fourth bearing 74 is placed so as to contact both the sleeve 86 fitted on the cylindrical protruding portion 11 and the flange portion Ia, and the fifth bearing 75 is placed so as to contact the cover portion 42 and to be slightly separated from the flange Ia. Thus, if the power transmission member T is moved toward the axial first direction A1 side by the axial load, the fifth bearing 75 contacts the flange portion Ia when the amount of movement of the power transmission member T becomes equal to a second clearance D2 (see FIG. 5) between the side face of the flange portion Ia located on the axial second direction A2 side and the side face of the fifth bearing 75 located on the axial first direction A1 side. Thus, the cover portion 42 is supported by the cylindrical protruding portion 11 via the sleeve 86, the fourth bearing 74, the flange portion Ia, and the fifth bearing 75. Note that the second clearance D2 is equal to the distance by which the power transmission member T is movable relative to the case 3 in the axial direction in a region where the fourth bearing 74 and the fifth bearing 75 as the restricting bearings are provided.

In the present embodiment, the second clearance D2 between the flange portion Ia and the fifth bearing 75 is set to a value smaller than the first clearance D1 between the first stepped portion 11*b* and the first bearing 71. In other words, the distance by which the power transmission member T is movable relative to the case 3 in the axial direction in the region where the fourth bearing 74 and the fifth bearing 75 are provided is set to a value smaller than the distance by which the power transmission member T is movable relative to the case 3 in the axial direction in the region where the first bearing 71 is provided. Thus, even if the power transmission member T is moved toward the axial first direction A1 side by the axial load, the second clearance D2 is eliminated before the first clearance D1 is eliminated, whereby the cover portion 42 that forms the power transmission member T is supported in the axial direction by the cylindrical protruding portion 11 via the sleeve 86, the fourth bearing 74, the flange portion Ia, and the fifth bearing 75. This reliably restricts further movement of the power transmission member T toward the axial first direction A1 side from this state. Accordingly, it is possible to more reliably suppress application of the axial load to the first bearing 71 due to the first bearing 71 contacting the first stepped portion 11*b*.

In the present embodiment, as shown in FIGS. 3 and 4, a sixth bearing 76 is placed between the cover portion 42 and the turbine runner 51 of the torque converter TC in the axial direction. More specifically, the sixth bearing 76 is placed between the cylindrical extending portion 46 of the cover portion 42 and the radially extending portion 52 of the turbine runner 51 in the axial direction. In this example, the sixth bearing 76 is placed between the side face of the stepped portion 46*a* formed in the inner peripheral surface of the cylindrical extending portion 46, which is located on the axial second direction A2 side, and the side face of the cylindrical protruding portion 53 formed integrally with the radially extending portion 52, which is located on the axial first direction A1 side. Unlike the first bearing 71, a bearing capable of receiving an axial load is used as the sixth bearing 76, and a thrust washer is used in this example.

For example, in the state in which the rotational speed of the intermediate shaft M is maintained substantially constant, relatively small torque is applied to the spline coupling portion between the cylindrical protruding portion 53 of the turbine runner 51 and the intermediate shaft M. Thus, it is more likely that relative movement between the cylindrical protruding portion 53 and the intermediate shaft M in the axial direction is allowed. In such a situation, the entire torque converter TC may move toward the axial first direction A1 side.

In the present embodiment, however, the entire torque converter TC is also supported by the case 3 in the axial direction from the axial first direction A1 side via the sixth bearing 76 placed between the cylindrical extending portion 46 and the cylindrical protruding portion 53. That is, the cover portion 42 that forms the power transmission member T is supported in the axial direction by the cylindrical protruding portion 11 of the case 3 via the sleeve 86, the fourth bearing 74, the flange portion Ia, and the fifth bearing 75, and the cylindrical protruding portion 53 of the turbine runner 51 is supported, via the sixth bearing 76, in the axial direction by the cylindrical extending portion 46 provided in the cover portion 42. Moreover, as shown in FIG. 2, the one-way clutch 57 coupled to the stator 56 is supported, via the seventh bearing 77, in the axial direction by the radially extending portion 52 formed integrally with the cylindrical protruding portion 53, and the pump drive shaft 47 that rotates integrally with the pump impeller 41 is supported in the axial direction by the one-way clutch 57 via the eighth bearing 78. Thus, even if the entire torque converter TC moves toward the axial first direction A1 side, the entire torque converter TC can be appropriately supported in the axial direction.

Note that in the present embodiment, the sixth bearing 76 and the seventh bearing 77 correspond to "bearings separate from the support bearing."

4. Other Embodiments

Lastly, other embodiments of the vehicle drive device of the present invention will be described below. Note that the structure disclosed in each of the following embodiments is not applied only in that embodiment, but may be applied in combination with the structures disclosed in the other embodiments as long as no inconsistency arises.

(1) The above embodiment is described with respect to an example in which the cover portion 42 that forms the power transmission member T is supported in the axial direction by the cylindrical protruding portion 11 provided on the end support wall 5 of the case 3, via the fourth bearing 74 and the fifth bearing 75. However, embodiments of the present invention are not limited to this. That is, it is also one of preferred embodiments of the present invention that the power transmission member T be supported in the axial direction by another portion of the case 3, which is different from the cylindrical protruding portion 11, via the fourth bearing 74 and the fifth bearing 75, as long as axial movement of the power transmission member T toward the axial first direction A1 side can be restricted. In this case, the movement restricting mechanism R is formed by the another portion of the case 3, and the fourth bearing 74 and the fifth bearing 75 as the restricting bearing.

(2) The above embodiment is described with respect to an example in which the rotor support member 22 that forms the power transmission member T is supported, via the first bearing 71, in the radial direction by the cylindrical protruding portion 11 provided on the end support wall 5 of the case 3. However, embodiments of the present invention are not limited to this. That is, it is also one of preferred embodiments of the present invention that the rotor support member 22 be supported in the radial direction by another portion of the case 3, which is different from the cylindrical protruding portion 11, via the first bearing 71.

(3) The above embodiment is described with respect to an example in which the first clearance D1 is provided between the first stepped portion 11b of the cylindrical protruding portion 11 and the first bearing 71, the second clearance D2 is provided between the flange portion Ia of the input shaft I and the fifth bearing 75, and the second clearance D2 is set to a value smaller than the first clearance D1. However, embodiments of the present invention are not limited to this. That is, it is also one of preferred embodiments of the present invention that, for example, no second clearance D2 be provided, and the cover portion 42 be supported in the axial direction with adjacent ones of the cylindrical protruding portion 11, the sleeve 86, the fourth bearing 74, the flange portion Ia, the fifth bearing 75, and the cover portion 42 being in contact with each other.

Figure 6:
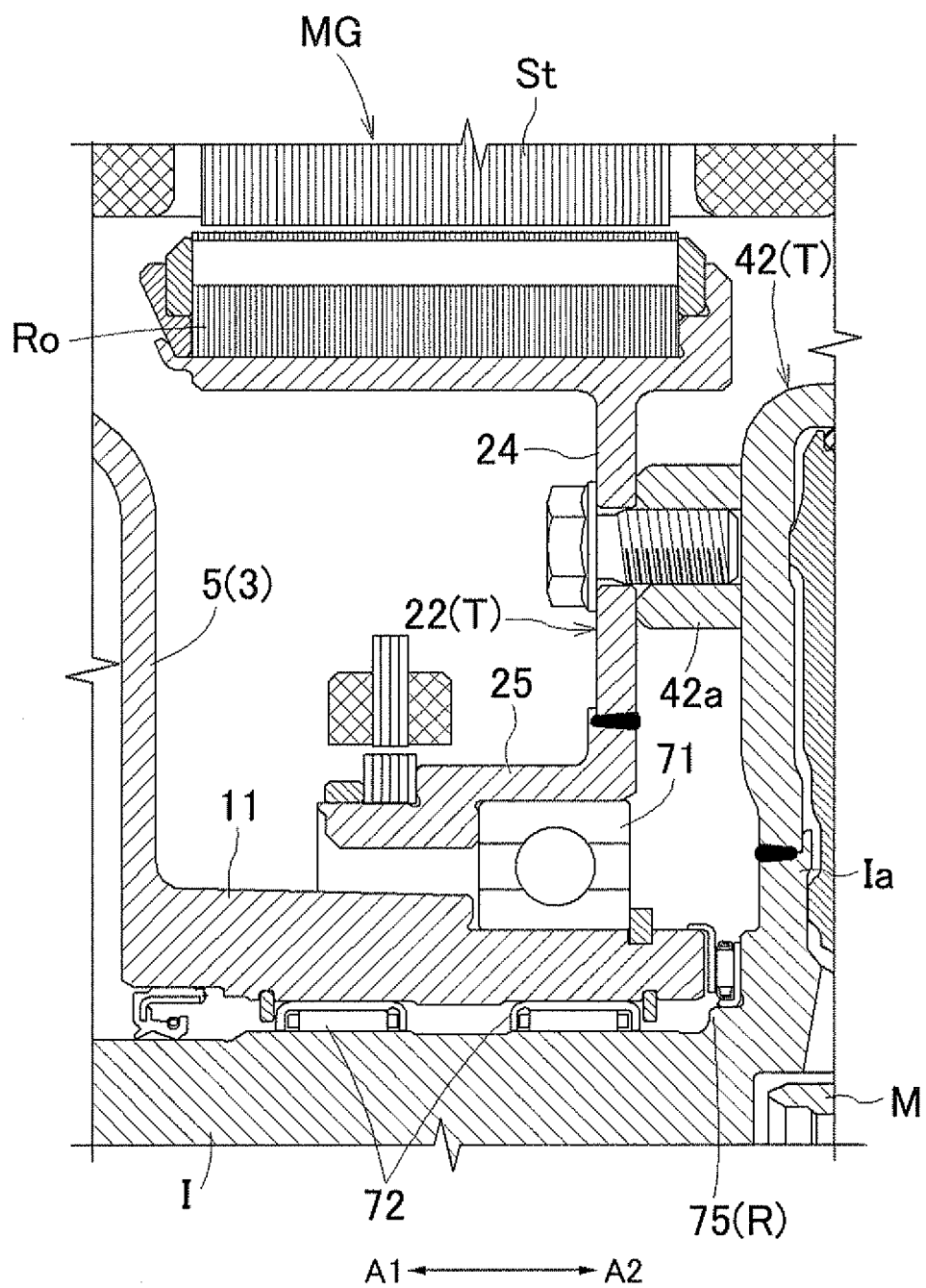
FIG. 6 is a cross-sectional view of a main portion of a drive device according to another embodiment of the present invention.

(4) The above embodiment is described with respect to an example in which the input clutch C1 is provided between the input shaft I and the power transmission member T on the power transmission path, and the power transmission member T is formed by coupling the rotor support member 22, the cylindrical coupling member 32 as a clutch drum of the input clutch C1, and the cover portion 42 so that the rotor support member 22, the cylindrical coupling member 32, and the cover portion 42 rotate together. However, embodiments of the present invention are not limited to this. That is, the present invention may also be applied to a drive device 1 that does not include such an input clutch C1. In this case, as shown in, e.g., FIG. 6, the power transmission member T is formed by directly coupling and fixing the rotor support member 22 and the cover portion 42 together without using the cylindrical coupling member 32. Note that the rotor support member 22 is coupled to the cover portion 42 only via a cover-side coupling portion 42a bonded to the cover portion 42. In this case, unlike the above embodiment, the flange portion Ia of the input shaft I is coupled to the cover portion 42 so as to rotate together therewith. Thus, only one fifth bearing 75 as the restricting bearing that forms the movement restricting mechanism R is placed between the cylindrical protruding portion 11 and the cover portion 42 in the axial direction.

(5) The above embodiment is described with respect to an example in which the thrust bearings are used as the fourth bearing 74, the fifth bearing 75, the seventh bearing 77, and the eighth bearing 78, and the thrust washer is used as the sixth bearing 76. However, embodiments of the present invention are not limited to this, That is, these bearings need only to be bearings capable of receiving at least an axial load, and it is also one of preferred embodiments of the present invention to combine thrust bearings, thrust washers, and others, as appropriate.

Figure 7:
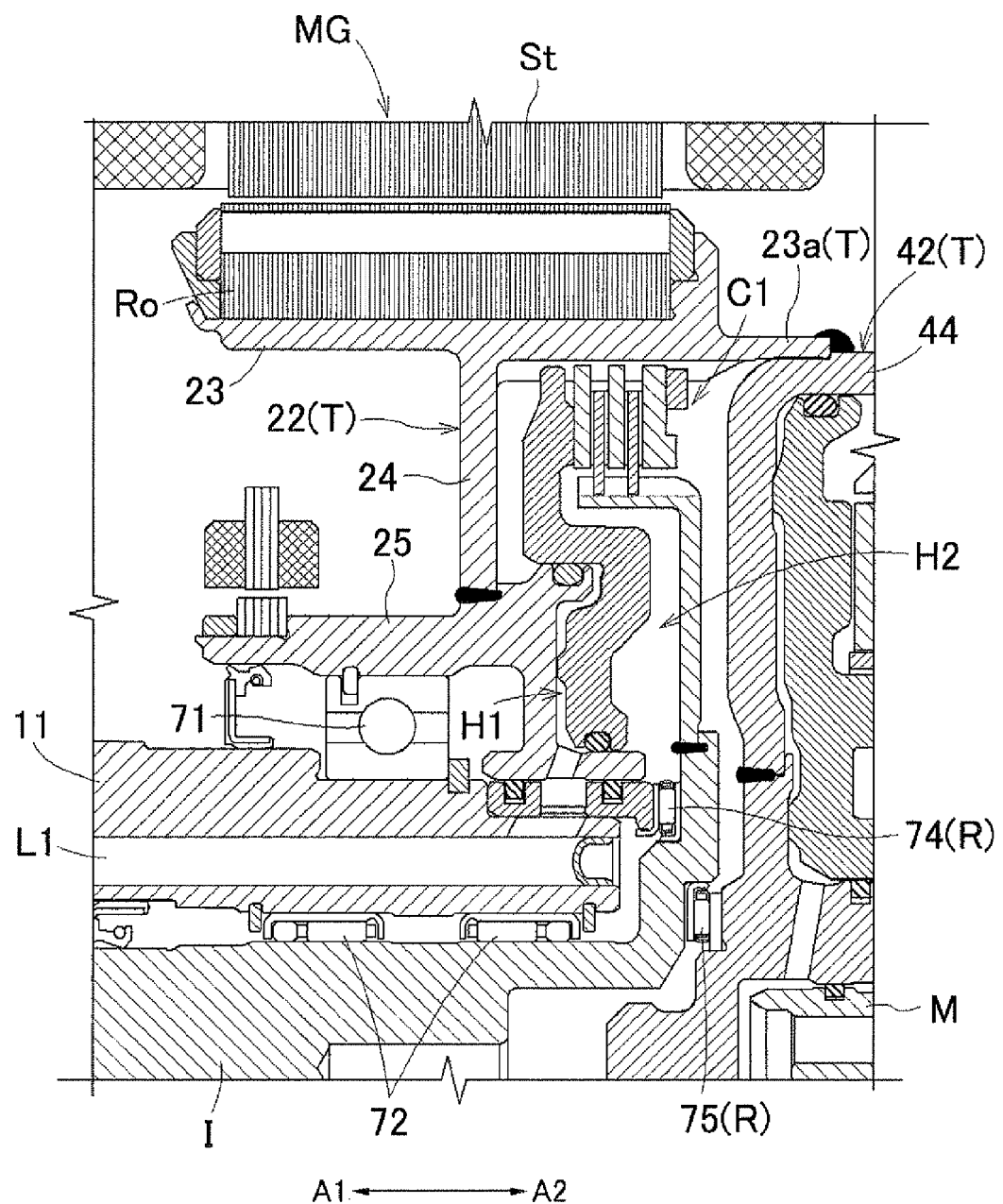
FIG. 7 is a cross-sectional view of a main portion of a drive device according to still another embodiment of the present invention.

(6) The above embodiment is described with respect to an example in which the rotor support member 22 and the cylindrical coupling member 32 are separate members independent of each other. However, embodiments of the present invention are not limited to this. That is, for example, it is also one of preferred embodiments of the present invention to integrally form the rotor support member 22 and the cylindrical coupling member 32. FIG. 7 shows an example of such a structure. In the illustrated example, the rotor holding portion 23 of the rotor support member 22 is structured so as to function as the clutch drum of the input clutch C1, and the rotor support member 22 is directly fixed to the cover portion 42 via the rotor holding portion 23. In this example, the inner peripheral surface of a cylindrical axially protruding portion 23a protruding further toward the axial second direction A2 side from the end of the rotor holding portion 23 on the axial second direction A2 side and the outer peripheral surface of the axially extending portion 44 are bonded together by welding in the state in which the inner peripheral surface of the axially protruding portion 23a and the outer peripheral surface of the axially extending portion 44 are fitted to each other while in contact with each other along the entire circumference, whereby the axially protruding portion 23a is integrally coupled and fixed to the axially extending portion 44.

(7) The above embodiment is described with respect to an example in which the clutch hub 31 is drivingly coupled to the input shaft I so as to rotate together therewith, and the cylindrical coupling member 32 that forms the power transmission member T functions as the clutch drum is paired with the clutch hub 31. However, embodiments of the present invention are not limited to this. That is, for example, it is also one of preferred embodiments of the present invention that the clutch drum be drivingly coupled to the input shaft I so as to rotate together therewith, and the cylindrical coupling member 32 be formed so as to have a clutch hub that is paired with the clutch drum.

(8) The above embodiment is described with respect to an example in which the torque converter TC having the pump impeller 41, the turbine runner 51, and the stator 56 is included in the drive device 1 as a fluid coupling. However, embodiments of the present invention are not limited to this. That is, for example, it is also one of preferred embodiments of the present invention that a fluid coupling that does not have the stator 56 and has only the pump impeller 41 and the turbine runner 51 is included in the drive device 1 as the fluid coupling.

(9) The above embodiment is described with respect to an example in which the drive device 1 has a structure suitable for being mounted on front-engine, rear-wheel drive (FR) vehicles, namely a uniaxial structure in which the overall structure of the drive device 1 is placed on the same axis. However, embodiments of the present invention are not limited to this. That is, it is also one of preferred embodiments of the present invention that the drive device 1 has a multi-axis structure in which the drive device has, e.g., a counter gear mechanism, and an axle is placed so that its central axis is shifted from the common central axis X of the input shaft I and the intermediate shaft M. The drive device having such a structure is suitable for being mounted on front-engine, front-wheel drive (FF) vehicles.

(10) Regarding other structures as well, the embodiments disclosed in the specification are by way of example only in all respects, and embodiments of the present invention are not limited thereto. That is, it is to be understood that the configurations in which the structures that are not described in the claims are partially modified as appropriate also fall within the technical scope of the present invention, as long as the configurations include the structures described in the claims of the present application and the structures equivalent thereto.

The present invention can be preferably used for vehicle drive devices including an input member drivingly coupled to an internal combustion engine, an output member drivingly coupled to a wheel, a rotating electrical machine, a fluid coupling, and a case accommodating at least the rotating electrical machine and the fluid coupling.

The invention claimed is:

1. A vehicle drive device, comprising:
    an input member drivingly coupled to an internal combustion engine;
    an output member drivingly coupled to a wheel;
    a rotating electrical machine;
    a fluid coupling; and
    a case containing at least the rotating electrical machine and the fluid coupling, wherein
    the fluid coupling includes a coupling input-side member, and a coupling output-side member that is paired with the coupling input-side member,
    the rotating electrical machine includes a rotor main body and a rotor support member that extends inward in a radial direction from the rotor main body on an axial first direction side, the axial first direction side being one side in an axial direction with respect to the coupling input-side member, and supports the rotor main body, the rotor main body being rotatably supported in the radial direction by the case via a support bearing,
    a power transmission member is formed by coupling at least the rotor support member and the coupling input-side member together so that at least the rotor support member and the coupling input-side member rotate together, and a movement restricting mechanism that restricts axial movement of the power transmission member toward the axial first direction side is provided,
    the movement restricting mechanism has a restricting bearing that rotatably supports the power transmission member separately from the support bearing, and an axial support portion of the case that supports the restricting bearing from the axial first direction side, and
    a distance by which the power transmission member is movable relative to the case in the axial direction in a region where the restricting bearing is provided is set to a value smaller than a distance by which the power transmission member is movable relative to the case in the axial direction in a region where the support bearing is provided.

2. The vehicle drive device according to claim 1, wherein
    the coupling input-side member includes a cover portion that contains a main body of the fluid coupling,
    the case has a support wall that extends at least in the radial direction on the axial first direction side with respect to the rotating electrical machine and the fluid coupling and a cylindrical protruding portion that protrudes from the support wall to an axial second direction side that is opposite toward the axial first direction side, and
    the rotor support member is supported by an outer peripheral surface of the cylindrical protruding portion via the support bearing, and the cover portion is rotatably supported at an end of the cylindrical protruding portion on the axial second direction side by the movement restricting mechanism.

3. The vehicle drive device according to claim 2, further comprising:
    an engagement device having an engagement input-side member, and an engagement output-side member that is paired with the engagement input-side member, wherein
    the input member is coupled to the engagement input-side member via an input-side radially extending portion that extends in the radial direction between the cylindrical protruding portion and the fluid coupling in the axial direction so that the input member and the engagement input-side member rotate together,
    the engagement output-side member is coupled to the rotor support member and the coupling input-side member so as to rotate together therewith and forms, together with the rotor support member and the coupling input-side member, the power transmission member, and the movement restricting mechanism has two restricting bearings separate from the support bearing, the two restricting bearings being placed between the cylindrical protruding portion and the input-side radially extending portion in the axial direction and between the input-side radially extending portion and the power transmission member in the axial direction, respectively.

4. The vehicle drive device according to claim 1, wherein
the fluid coupling is a torque converter having a stator between the coupling input-side member and the coupling output-side member,
the stator is coupled to the case via a one-way clutch,
the coupling input-side member has a first direction-side support portion that is located on the axial first direction side with respect to the one-way clutch,
the coupling output-side member has an output-side radially extending portion that extends in the radial direction between the first direction-side support portion and the one-way clutch in the axial direction, and
the bearings separate from the support bearing are placed between the first-direction side support portion and the output-side radially extending portion in the axial direction and between the output-side radially extending portion and the one-way clutch in the axial direction, respectively.

5. A vehicle drive device, comprising:
an input member drivingly coupled to an internal combustion engine;
an output member drivingly coupled to a wheel;
a rotating electrical machine;
a fluid coupling;
a case containing at least the rotating electrical machine and the fluid coupling; and
an engagement device having an engagement input-side member, and an engagement output-side member that is paired with the engagement input-side member, wherein
the fluid coupling includes a coupling input-side member, and a coupling output-side member that is paired with the coupling input-side member,
the rotating electrical machine includes a rotor main body and a rotor support member that extends inward in a radial direction from the rotor main body on an axial first direction side, the axial first direction side being one side in an axial direction with respect to the coupling input-side member, and supports the rotor main body, the rotor main body being rotatably supported in the radial direction by the case via a support bearing,
a power transmission member is formed by coupling at least the rotor support member and the coupling input-side member together so that at least the rotor support member and the coupling input-side member rotate together, and a movement restricting mechanism that restricts axial movement of the power transmission member toward the axial first direction side is provided,
the coupling input-side member includes a cover portion that contains a main body of the fluid coupling,
the case has a support wall that extends at least in the radial direction on the axial first direction side with respect to the rotating electrical machine and the fluid coupling and a cylindrical protruding portion that protrudes from the support wall to an axial second direction side that is opposite toward the axial first direction side,
the rotor support member is supported by an outer peripheral surface of the cylindrical protruding portion via the support bearing, and the cover portion is rotatably supported at an end of the cylindrical protruding portion on the axial second direction side by the movement restricting mechanism,
the input member is coupled to the engagement input-side member via an input-side radially extending portion that extends in the radial direction between the cylindrical protruding portion and the fluid coupling in the axial direction so that the input member and the engagement input-side member rotate together,
the engagement output-side member is coupled to the rotor support member and the coupling input-side member so as to rotate together therewith and forms, together with the rotor support member and the coupling input-side member, the power transmission member, and
the movement restricting mechanism has two restricting bearings separate from the support bearing, the two restricting bearings being placed between the cylindrical protruding portion and the input-side radially extending portion in the axial direction and between the input-side radially extending portion and the power transmission member in the axial direction, respectively.

6. The vehicle drive device according to claim 5, wherein
the fluid coupling is a torque converter having a stator between the coupling input-side member and the coupling output-side member,
the stator is coupled to the case via a one-way clutch,
the coupling input-side member has a first direction-side support portion that is located on the axial first direction side with respect to the one-way clutch,
the coupling output-side member has an output-side radially extending portion that extends in the radial direction between the first direction-side support portion and the one-way clutch in the axial direction, and
the bearings separate from the support bearing are placed between the first-direction side support portion and the output-side radially extending portion in the axial direction and between the output-side radially extending portion and the one-way clutch in the axial direction, respectively.

* * * * *